United States Patent
Yasui et al.

(10) Patent No.: US 10,023,167 B2
(45) Date of Patent: Jul. 17, 2018

(54) ELECTRIC BRAKING DEVICE FOR VEHICLE

(71) Applicant: ADVICS CO., LTD., Kariya-shi, Aichi-ken (JP)

(72) Inventors: Yoshiyuki Yasui, Nagoya (JP); Hiroyuki Kodama, Kariya (JP); Motoshi Suzuki, Nagoya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 59 days.

(21) Appl. No.: 14/913,940

(22) PCT Filed: Aug. 25, 2014

(86) PCT No.: PCT/JP2014/072099
§ 371 (c)(1),
(2) Date: Feb. 23, 2016

(87) PCT Pub. No.: WO2015/025971
PCT Pub. Date: Feb. 26, 2015

(65) Prior Publication Data
US 2016/0355170 A1   Dec. 8, 2016

(30) Foreign Application Priority Data

Aug. 23, 2013 (JP) .................................. 2013-173834
Aug. 23, 2013 (JP) .................................. 2013-173835
Aug. 23, 2013 (JP) .................................. 2013-173839

(51) Int. Cl.
*B60T 13/74* (2006.01)
*B60T 17/18* (2006.01)
(Continued)

(52) U.S. Cl.
CPC ............ *B60T 13/746* (2013.01); *B60T 1/065* (2013.01); *B60T 13/741* (2013.01); *B60T 17/18* (2013.01);
(Continued)

(58) Field of Classification Search
CPC ........ B60T 13/746; B60T 1/065; B60T 17/22; B60T 2270/402; B60T 2270/414; B60T 8/176; H02K 7/14; H02P 4/00
See application file for complete search history.

(56) References Cited

U.S. PATENT DOCUMENTS 4,629,947 A * 12/1986 Hammerslag ........... B60L 11/16
310/74
6,059,060 A * 5/2000 Kanno .................... A61G 5/045
180/65.51
(Continued)

FOREIGN PATENT DOCUMENTS

DE        199 41 481 A1     3/2001
DE    10 2006 032279 A1     1/2008
(Continued)

OTHER PUBLICATIONS

Extended European Search Report issued by the European Patent Office dated Jul. 6, 2016, in corresponding European Application No. 14838496.9 ( 5 pgs).
(Continued)

*Primary Examiner* — Melody M Burch
(74) *Attorney, Agent, or Firm* — Buchanan Ingersoll & Rooney PC

(57) ABSTRACT

This electric braking device uses drive torque of an electric motor to push a friction member against a rotating member secured to a vehicle wheel and produce braking torque in the vehicle wheel. This device comprises a body power source for electric motor power supply secured to a body of the
(Continued)

vehicle, and a vehicle wheel power source for electric motor power supply secured to the vehicle wheel. The body power source supplies power to the vehicle wheel power source via a first electric path, and the vehicle wheel power source supplies power to the electric motor via a second electric path. When braking torque is produced in the vehicle wheel, the electric motor is normally driven using the vehicle wheel power source. An electric braking device is thereby provided in which a power line electrically connecting the body side and the vehicle wheel side bends readily.

6 Claims, 9 Drawing Sheets

(51) Int. Cl.
*B60T 17/22* (2006.01)
*B60T 1/06* (2006.01)
*H02K 7/14* (2006.01)
*H02P 4/00* (2006.01)
*B60T 8/176* (2006.01)
*B60T 8/175* (2006.01)

(52) U.S. Cl.
CPC ............... *B60T 17/22* (2013.01); *H02K 7/14* (2013.01); *H02P 4/00* (2013.01); *B60T 8/175* (2013.01); *B60T 8/176* (2013.01); *B60T 2270/402* (2013.01); *B60T 2270/414* (2013.01)

(56) References Cited

U.S. PATENT DOCUMENTS

| | | | |
|---|---|---|---|
| 6,116,704 A * | 9/2000 | Nakakita | B60L 7/10 180/65.1 |
| 6,571,163 B1 | 5/2003 | Heckmann et al. | |
| 2002/0074854 A1 | 6/2002 | Fukasawa | |
| 2003/0083797 A1 | 5/2003 | Yokoyama et al. | |
| 2005/0127749 A1 | 6/2005 | Hartmann et al. | |
| 2006/0212135 A1 * | 9/2006 | Degoul | B60T 8/321 700/9 |
| 2010/0070150 A1 * | 3/2010 | May | B60T 8/1703 701/71 |
| 2011/0266106 A1 | 11/2011 | Suzuki | |
| 2013/0264153 A1 | 10/2013 | Baukholt et al. | |

FOREIGN PATENT DOCUMENTS

| | | |
|---|---|---|
| FR | 2 952 886 A1 | 5/2011 |
| JP | 2000-312444 A | 11/2000 |
| JP | 2002-178900 A | 6/2002 |
| JP | 4154883 B2 | 9/2008 |
| JP | 2010-149798 A | 7/2010 |
| WO | WO-9825046 A1 * | 6/1998 |
| WO | 2012086223 A1 | 6/2012 |
| WO | WO 2012/079969 A1 | 6/2012 |

OTHER PUBLICATIONS

International Search Report (PCT/ISA/210) dated Nov. 25, 2014, by the Japanese Patent Office as the International Searching Authority for International Application No. PCT/JP2014/072099.

Written Opinion (PCT/ISA/237) dated Nov. 25, 2014, by the Japanese Patent Office as the International Searching Authority for International Application No. PCT/JP2014/072099 (with English language translation, 4 pages).

* cited by examiner

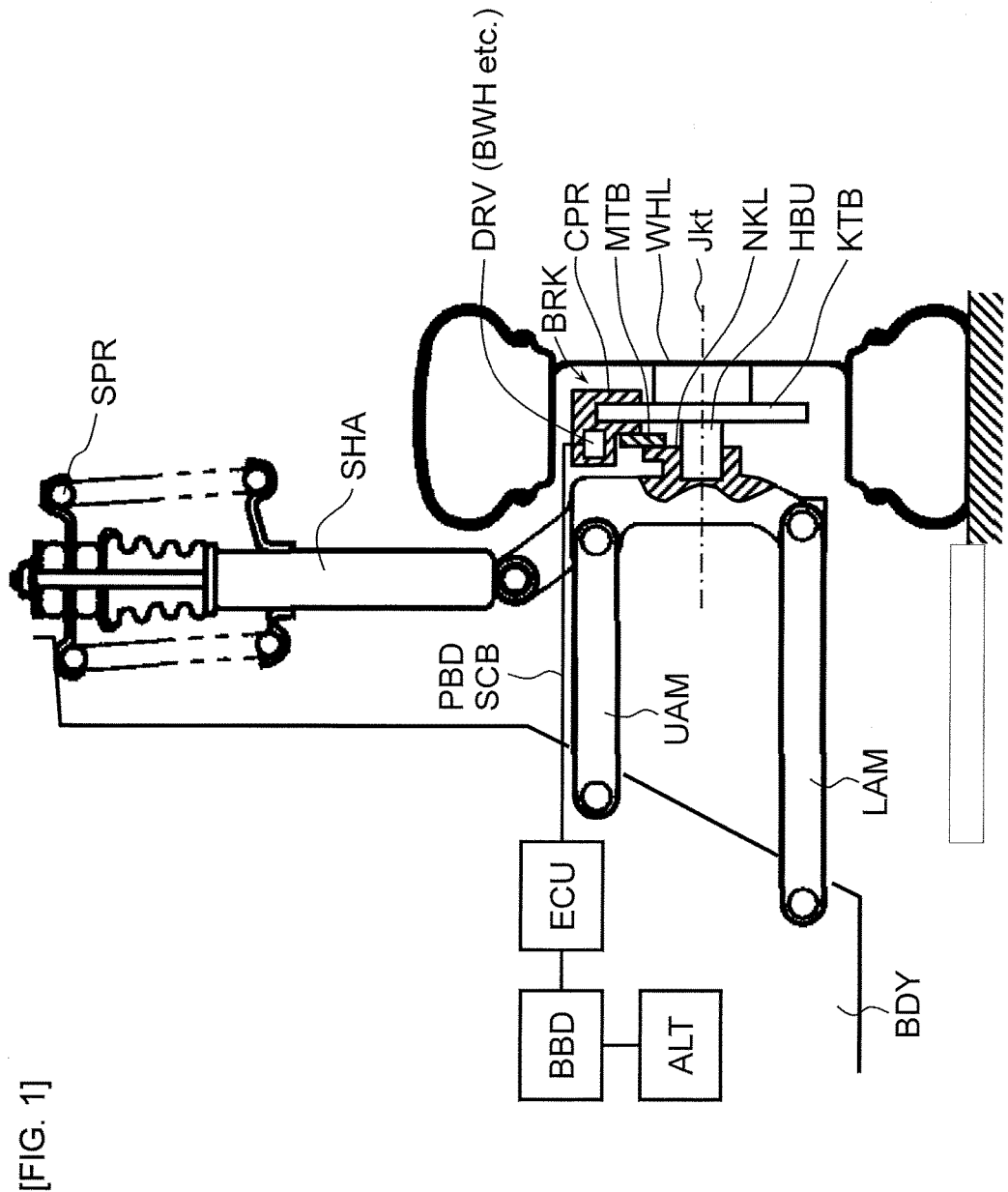
[FIG. 1]

[FIG. 2]
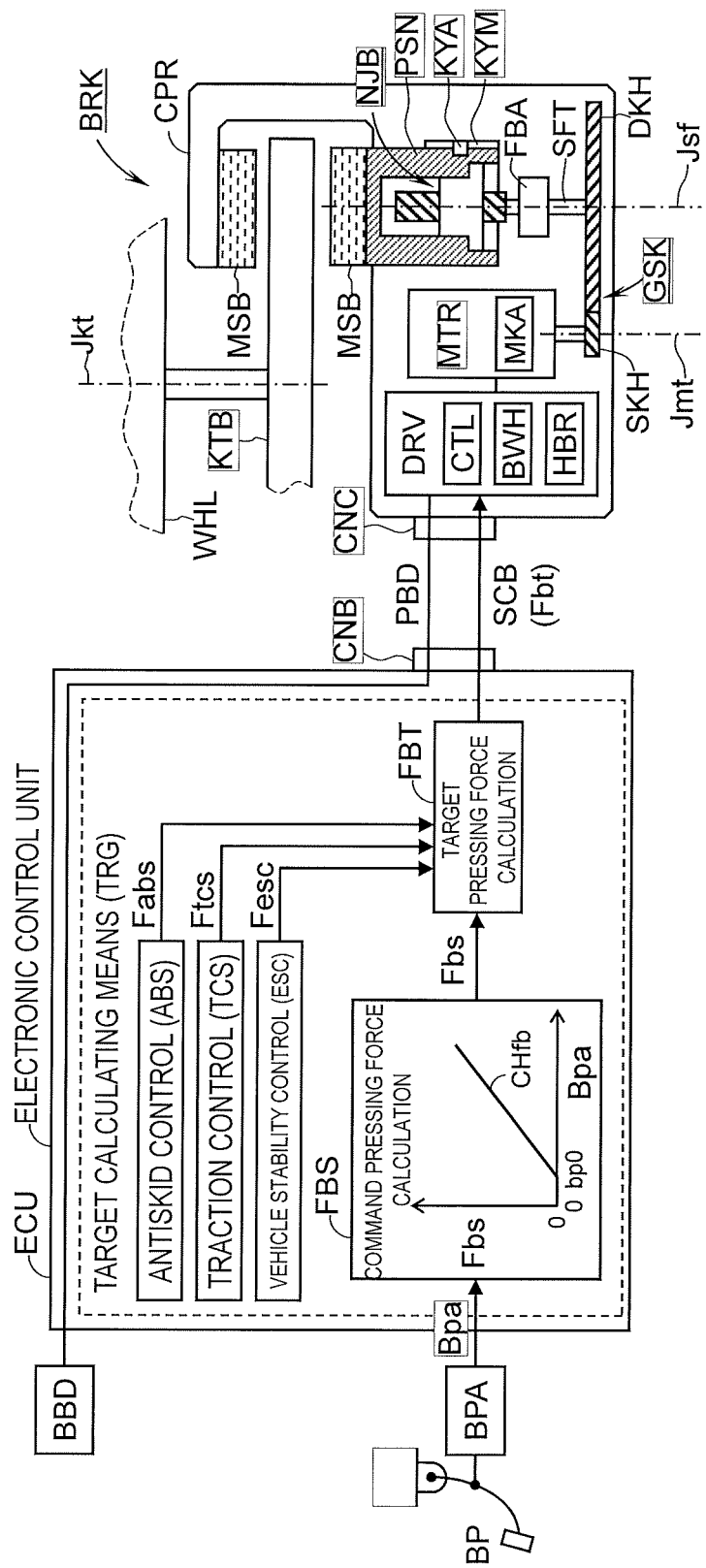

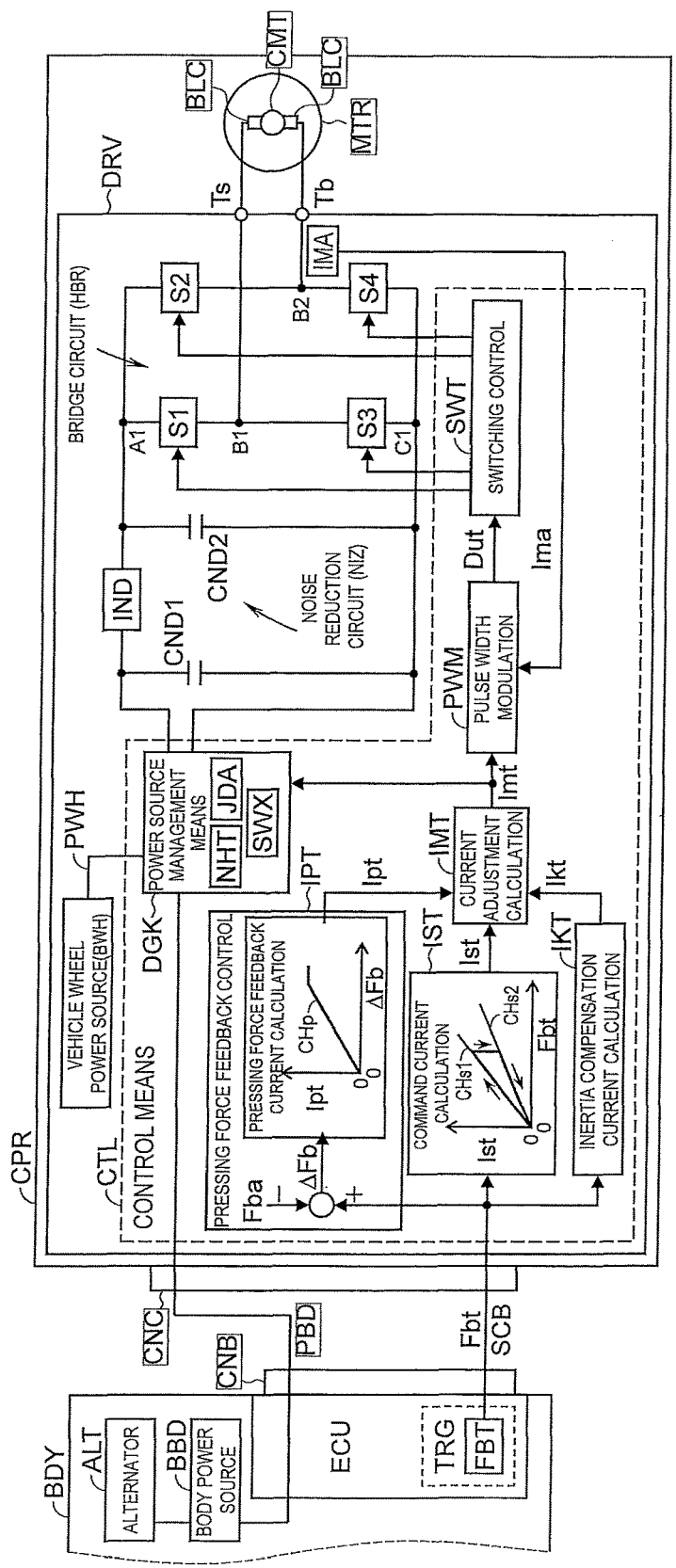
[FIG. 3]

[FIG. 4]
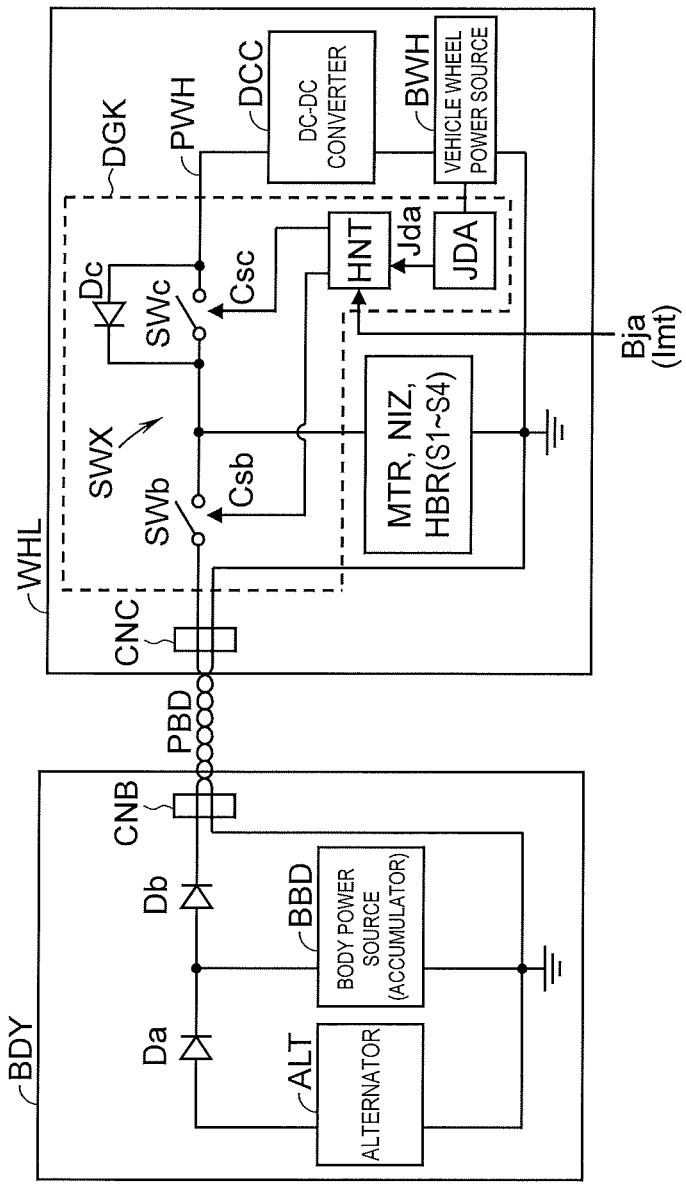

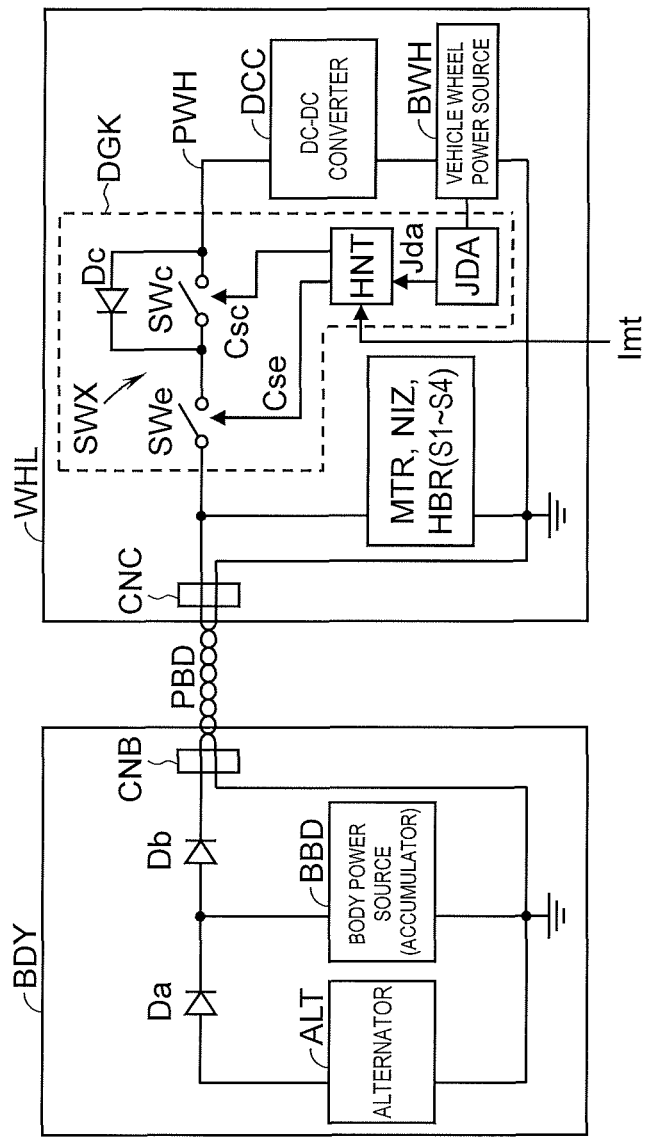
[FIG. 5]

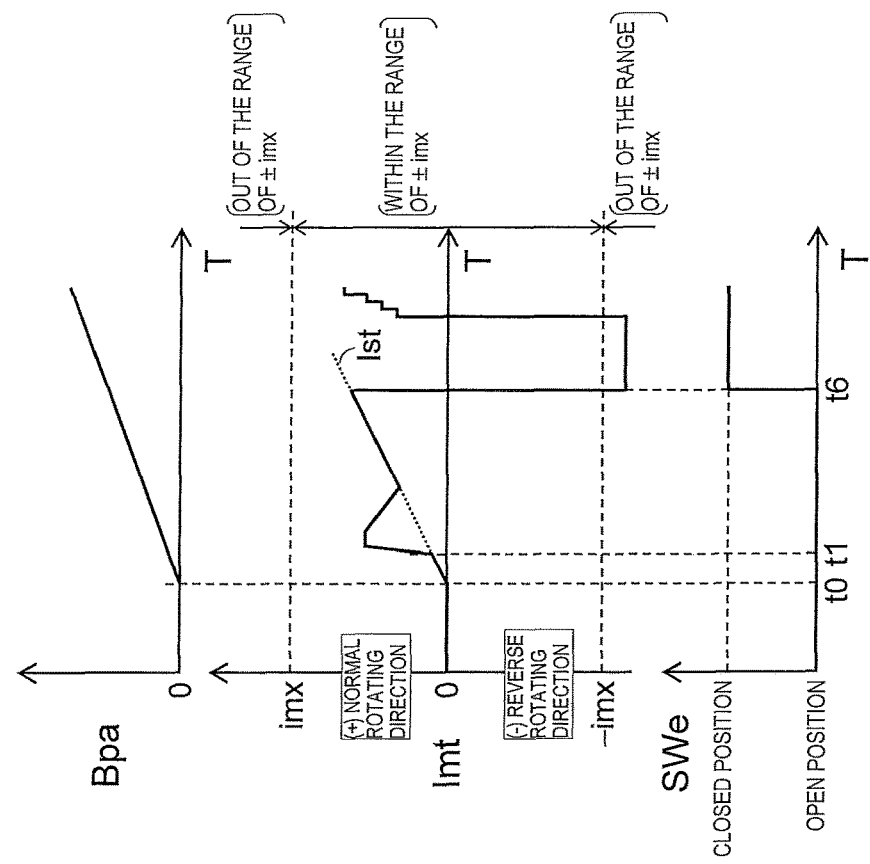
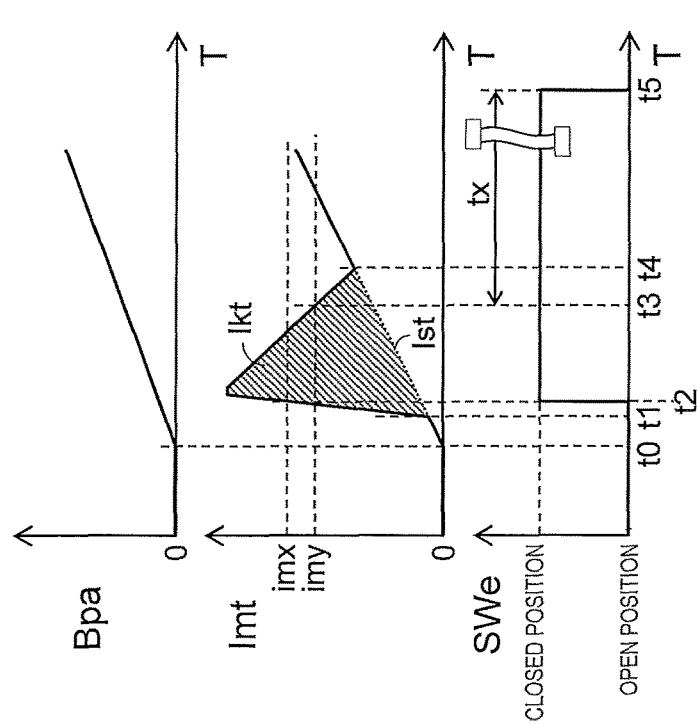

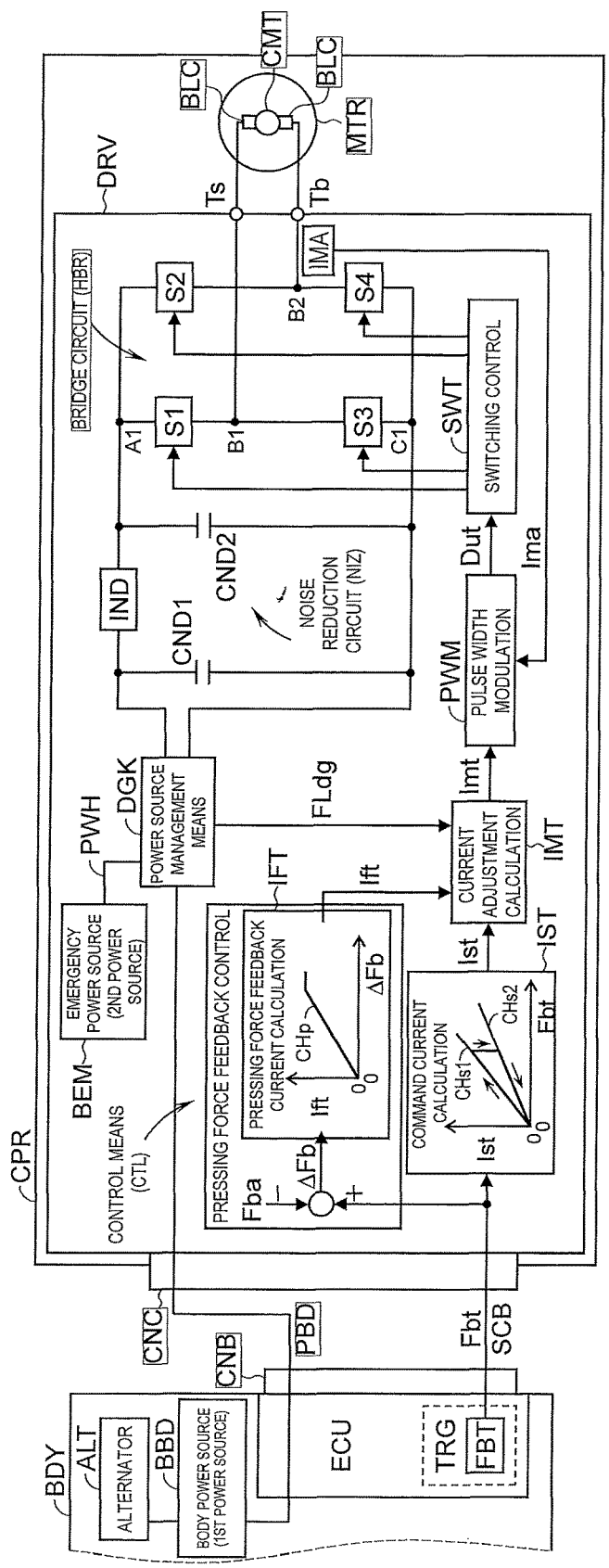
[FIG. 7]

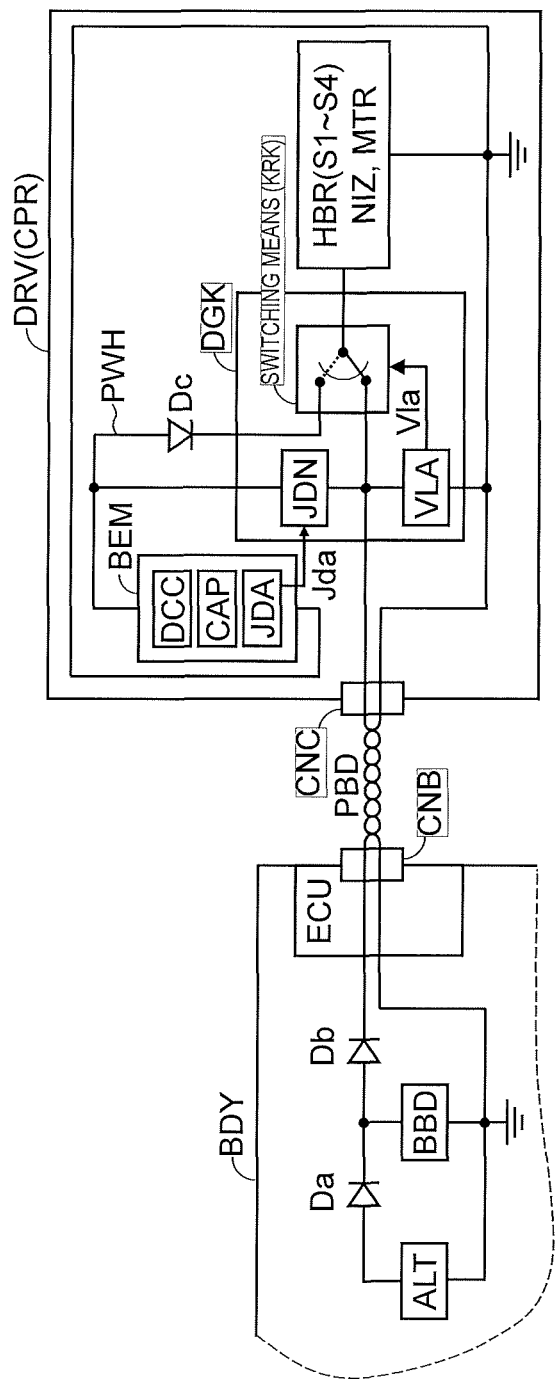
[FIG. 8]

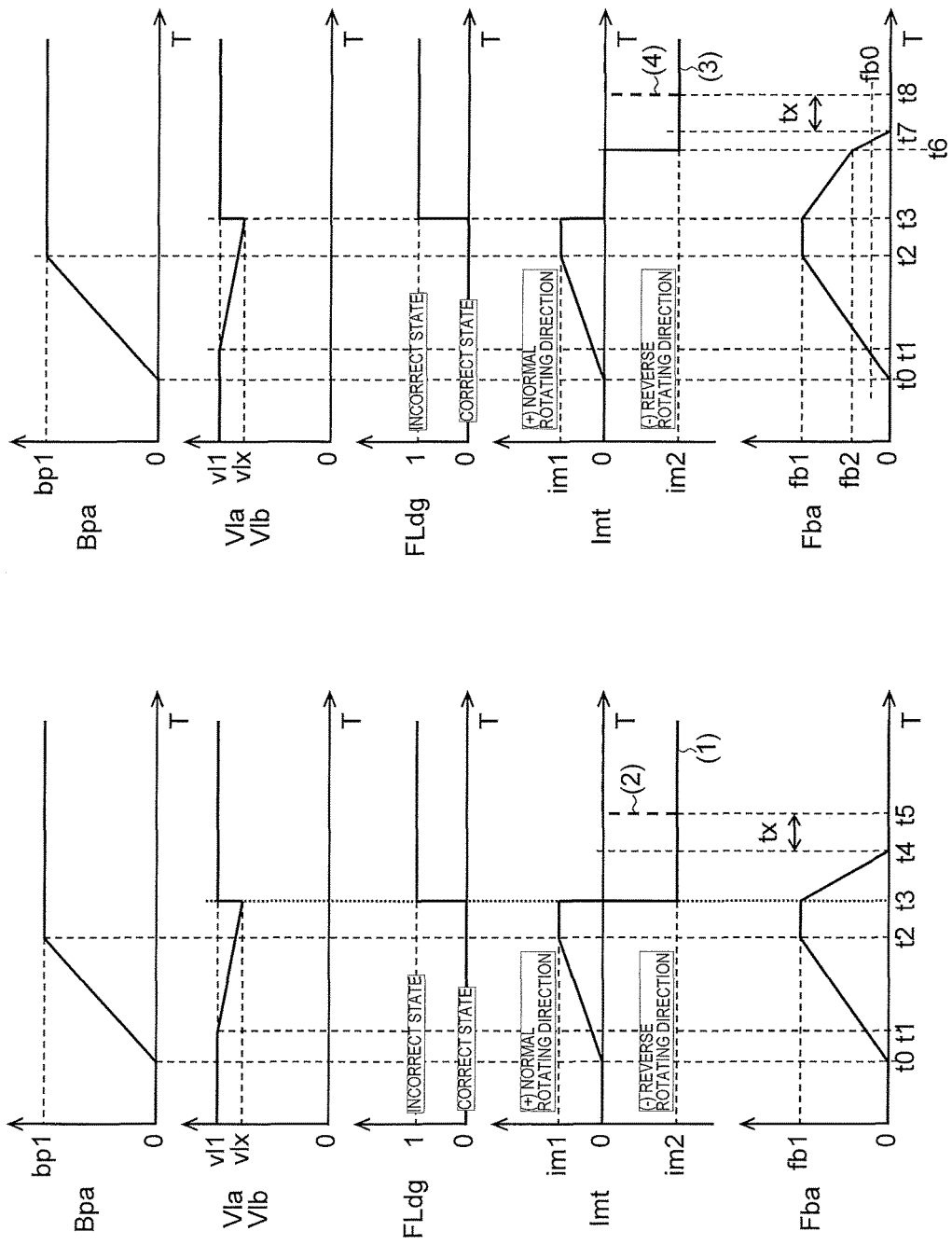

ELECTRIC BRAKING DEVICE FOR VEHICLE

TECHNICAL FIELD

The present invention relates to an electric braking device for vehicle.

BACKGROUND ART

Japanese Unexamined Patent Publication No. 2000-312444 describes "including a first system for supplying first electric energy from one power source mounted on a vehicle to a first predetermined electric device for vehicle, a second system for supplying second electric energy from another power source mounted on the vehicle to a second predetermined electric device for vehicle, and a conversion/supply means which converts the second electric energy into the first electric energy to supply the converted energy to the first system" "to provide a power source supply device for vehicle capable of supplying desired electric power to each electric device for vehicle even though one power source is disordered".

Furthermore, Japanese Unexamined Patent Publication No. 2000-312444 describes "including a remaining energy detection means which detects electric energy remaining amounts of the one power source and the other power source, and a power source selecting means which selects any one of the one power source and the conversion/supply means on the basis of the electric energy remaining amounts of the power sources to connect a selected one to the first system".

Japanese Patent No. 4154883 describes "installing a drive control device including a communication circuit, a control circuit, and a drive circuit for driving a motor on a vehicle wheel side and supplying electric power to the drive control device from a vehicle body side through two power lines to drive a motor mounted on wheels so as to generate braking force" "to reduce the cost of power lines which electrically connect a vehicle body side to a vehicle wheel side to provide an inexpensive braking device".

When a vehicle including a plurality of power sources illustrated in Japanese Unexamined Patent Publication No. 2000-312444 employs an electric braking device illustrated in Japanese Patent No. 4154883, the device requires power lines of two systems. Also when electric power depending on the maximum output of the device is supplied through the power lines, the power lines are required to be thick to some extent (large sectional areas) to minimize a voltage drop between both the ends of the power source lines. The thick power lines are hard to be bent. Vehicle wheels are relatively dislocated with respect to a vehicle through suspensions. Thus, the electric braking device is eagerly desired to have a configuration in which power lines for electrically connecting a vehicle body side to a vehicle wheel side are flexible.

The brochure of International Publication 2012/079969 discloses an electric braking device having a configuration in which "a rotational position of a spindle rotating by using drive torque of an electric motor when a friction member is pressed against a rotating member fixing to a wheel of a vehicle is turned back by a predetermined angle in an opposite direction of a side to which braking torque is applied by elastic force of a coil spring in failure".

In the device described in the brochure of International Publication 2012/079969, in an initial stage in which braking torque is applied, energy must be accumulated in a coil spring first. More specifically, an output from an electric motor is used to wind up the coil spring. Thereafter, the output is used to increase the braking torque. For this reason, initial responsiveness (rising characteristics of braking torque) when the braking torque is increased is desired to be improved. In this configuration, since energy must be accumulated in the coil spring every braking operation, improvement is required also in terms of energy saving.

SUMMARY OF INVENTION

The present invention has been made to cope with the problem and has as its object to provide an electric braking device in which power lines for electrically connecting a vehicle body side to a vehicle wheel side are flexible. Another object of the present invention is to provide an electric braking device for vehicle in which braking torque is reliably reduced when power supply from a vehicle body side to an electric motor is not adequately performed and energy saving and initial responsiveness of braking can be secured when the power supply is adequate.

The electric braking device for vehicle according to the present invention includes a rotating member (KTB) fixed to a wheel (WHL) of a vehicle, an electric motor (MTR) disposed on a vehicle wheel (WHL) side of the vehicle, a friction member (MSB) which presses the rotating member (KTB) by using drive torque of the electric motor (MTR) to generate braking torque on the vehicle wheel (WHL), a body power source (BBD) disposed on a body (BDY) side of the vehicle, a vehicle wheel power source (BWH) disposed on the vehicle wheel (WHL) side of the vehicle, and control means (CTL, DCC, and SWb) which drives the electric motor (MTR) by using at least one of the body power source (BBD) and the vehicle wheel power source (BWH) on the basis of a braking operation by a driver of the vehicle.

In this device, power sources for supplying electric power to the electric motor MTR are disposed on not only the body side but also the vehicle wheel side. The electric motor is disposed on the vehicle wheel side. Thus, when electric power is to be supplied from the body power source BBD to the electric motor MTR, the electric power must be supplied through "power lines for electrically connecting the body side to the vehicle wheel side". On the other hand, when electric power is to be supplied from the vehicle wheel power source BWH to the electric motor MTR, the electric power need not be supplied through the power lines. As a result, the power sources to supply electric power to the electric motor are arbitrarily selectively used to make a load on the power lines smaller than that on the power lines when the power source to supply electric power to the electric motor MTR is disposed on only the body side. More specifically, as the power lines, thinner wires (conductive wires each having a small sectional area) can be employed. As a result, the flexibility of the power lines (wires) can be further secured.

This device is preferably configured such that the body power source (BBD) supplies electric power to the vehicle wheel power source (BWH) through a first electric path (PBD+PWH), the vehicle wheel power source (BWH) supplies electric power to the electric motor (MTR) through a second electric path (PWH), and the control means (CTL, DCC, and SWb) drives the electric motor (MTR) by using the vehicle wheel power source (BWH) when braking torque is generated on the vehicle wheel (WHL).

According to this, at the request of non-braking (when a driver does not perform a braking operation, for example, when Bpa=0), the vehicle wheel power source BWH can be gradually charged by receiving electric power from the body power source BBD through the first electric path (body power lines PBD and vehicle wheel power lines PWH). Typically, the vehicle wheel power source BWH can be slowly charged for a time longer than a time (time required for braking from normal vehicle deceleration start time to normal vehicle deceleration end time) required for a normal vehicle deceleration operation. At the request of braking (when a driver performs a braking operation, for example, when Bpa>0), the electric motor MTR is driven by receiving electric power supplied from the vehicle wheel power source BWH through the second electric path (vehicle wheel power lines PWH). In other words, electric power supplied from the body power source BBD is temporarily accumulated in the vehicle wheel power source BWH. The electric power accumulated in the vehicle wheel power source BWH, as needed (in response to the request of braking), is supplied from the vehicle wheel power source BWH to the electric motor MTR.

For this reason, as "power lines for electrically connecting the body side to the vehicle wheel side", i.e., wires (first electric path) from the body power source BBD to the vehicle wheel power source BWH, thin wires (conductive wires each having a small section area) are employed. As a result, the flexibility of the power lines (wires) PBD can be secured. Furthermore, when the vehicle wheel power source BWH is configured to be adjacent to the electric motor MTR, the vehicle wheel power source BWH can be connected to a drive circuit of the electric motor with a bus bar (Bus Bar). Since the electric resistance of the bas bar is small, a voltage drop caused by the bus bar itself is small. Thus, in this case, the electric motor can be efficiently driven. In this case, the bus bar is a metal bar functioning as a conductor. Since the bus bar need not be covered with an insulator, high heat-radiation property can be obtained. Thus, the bus bar can easily cope with a heat-radiation problem occurring when a large current flows in the bus bar.

When the device includes charging state amount acquiring means (JDA) which acquires a charging state amount (Jda) of the vehicle wheel power source (BWH) and switching means (SWb) which connects/disconnects a third electric path (PBD) to supply electric power from the body power source (BBD) to the electric motor (MTR), the control means (CTL, DCC, and SWb) is preferably configured to disconnect the third electric path (PBD) and drive the electric motor (MTR) by using only the vehicle wheel power source (BWH) when the charging state amount (Jda) is a first predetermined value (jdx) or more, and to connect the third electric path (PBD) and drive the electric motor (MTR) by using the vehicle wheel power source (BWH) and the body power source (BBD) when the charging state amount (Jda) is less than the first predetermined value (jdx).

According to this, when the charging state amount Jda of the vehicle wheel power source BWH is adequate (Jda≥jdx), as an electric power source to the electric motor MTR, the vehicle wheel power source is singularly used. When the charging state amount Jda of the vehicle wheel power source BWH decreases (Jda<jdx), the power source to the electric motor MTR is changed from the vehicle wheel power source which is singularly used into the vehicle wheel power source and the body power source. As a result, during braking, electric power supplied to the electric motor MTR can be suppressed from being shortened. As the charging state amount Jda, for example, the voltage of the vehicle wheel power source BWH can be acquired.

In this case, the first electric path (PBD+PWH) is preferably configured to be disconnected when the charging state amount (Jda) is less than a second predetermined value (jdy, ≤jdx) which is equal to or less than the first predetermined value.

According to this, when the charging state amount Jda of the vehicle wheel power source BWH further decreases, an electric path between the body power source BBD and the vehicle wheel power source BWH is disconnected. Thus, electric power supplied from the body power source BBD can be mainly consumed to drive the electric motor MTR without being consumed to charge the vehicle wheel power source BWH. As a result, the electric motor MTR can be efficiently driven, and electric power supplied to the electric motor MTR can be more suppressed from being shortened.

In the electric braking device for vehicle according to the present invention, the control means (CTL) is configured to calculate a current conduction target value (Imt) of the electric motor (MTR) on the basis of the braking operation performed by the driver of the vehicle, to drive the electric motor (MTR) by using only the body power source (BBD and ALT) when the current conduction target value (Imt) is less than a first threshold value (imx), and to drive the electric motor (MTR) by using the body power source (BBD and ALT) and the vehicle wheel power source (BWH) when the current conduction target value (Imt) is the first threshold value (imx) or more.

According to this, at the request of normal braking at which much responsiveness of braking torque is not required (Imt<imx), electric power is supplied from only the body power source BBD to drive the electric motor MTR. On the other hand, at the request of sudden braking (Imt≥imx) at which responsiveness of braking torque is required, electric power is supplied from not only the body power source BBD but also the vehicle wheel power source BWH to drive the electric motor MTR. In other words, when the electric motor MTR requires huge electric power, electric power is accessorily supplied from the vehicle wheel power source BWH. Thus, it need not be assumed that huge electric power from the body power source BBD is supplied to the electric motor MTR through "power lines for electrically connecting the body side to the vehicle wheel side". As a result, as the power lines, relatively thin wires (conductive wires each having a small sectional area) can be employed. As a result, the flexibility of the power lines (wires) can be secured.

In this device, the control means (CTL) can be configured such that an inertia compensation current conduction amount (Ikt) for compensating for an influence of inertia of a "force transmission mechanism operating in relation to generation of braking torque from the electric motor (MTR) to the friction member (MSB)" is calculated and the current conduction target value (Imt) is calculated on the basis of the inertia compensation current conduction amount (Ikt). In this case, the control means (CTL) is preferably configured to drive the electric motor (MTR) by using the body power source (BBD and ALT) and the vehicle wheel power source (BWH) for a time from "a point of time when the current conduction target value (Imt) reaches the first threshold value (imx) while increasing" to "a point of time (t5) when a predetermined time (tx) has elapsed from a point of time (t3) when, thereafter, the current conduction target value (Imt) reaches a second threshold value (imy) which is less than the first threshold value (imx) while decreasing".

It is assumed that control for compensating for an inertia (hereinafter, referred to as "inertia compensation control") of the force transmission mechanism (in particular, the electric motor MTR) is executed. The inertia compensation control will be described later in detail. In this case, when the condition given by Imt≥imx is satisfied, after inertia compensation control is ended (i.e., after Imt<imy (<imx) is satisfied), the probability of satisfying the condition given by Imt imx again is high (see FIG. 6A (will be described later)). The configuration described above is based on the knowledge. In the configuration, power supply assistance from the vehicle wheel power source BWH at the point of time (t3) when imt<imy is satisfied, and the power supply assistance from the vehicle wheel power source BWH is ended at the point of time (t5) when the predetermined time tx has been elapsed from the point of time (t3). As a result, the power sources serving as power supply sources can be suppressed from being frequently switched. Since the second threshold value imy is set to a value smaller than the first threshold value imx, hunting of determination can also be suppressed when the target current conduction amount Imt slightly changes near the value imx.

In the electric braking device for vehicle according to the present invention, the control means (CTL) can be configured such that the electric motor (MTR) is normally driven by using the body power source (BBD), a power supply state from the body power source (BBD) to the electric motor (MTR) is determined in an adequate state (FLdg=0) or an inadequate state (FLdg=1), and, only when the inadequate state (FLdg=1) is determined and when pressing force (Fba) of the friction member (MSB) against the rotating member (KTB) is generated, the electric motor (MTR) is driven to decrease the pressing force (Fba) by using the vehicle wheel power source (to also be referred to as an emergency power source (BEM) hereinafter) in place of the body power source (BBD).

According to this, when power supply from the power source (body power source BBD) on the body side to the electric motor MTR is inadequately performed, the electric motor MTR is driven by using the power source (vehicle wheel power source and emergency power source BEM) on the vehicle wheel side to reliably execute an operation (retracting operation) in which braking torque is decreased toward zero.

On the other hand, when the power supply from the body power source BBD to the electric motor MTR is adequately performed, the body power source BBD is mainly used, and the emergency power source BEM is not used. In other words, at the request of normal braking (i.e., at the request of nonemergency braking), the emergency power source BEM does not function at all. For this reason, the emergency power source BEM does not adversely affect the initial responsiveness of braking, and the emergency power source BEM does not needlessly consume energy.

In the device, the control means (CTL) is preferably configured such that the electric motor (MTR) to increase the pressing force (Fba) is not driven when the electric motor (MTR) is driven by using the emergency power source (BEM).

According to this, when the emergency power source BEM is used, an increase in braking torque is not performed, and only a decrease in braking torque is performed. For this reason, an electric capacity (electric energy capacity) of the emergency power source BEM can be reduced. As a result, the entire device can be reduced in size and weight.

In the device, the control means (CTL), until the determination result is changed from the inadequate state into the adequate state after it is determined that the decrease of the pressing force (Fba) is ended, preferably stops current conduction to the electric motor (MTR).

According to this, after the retracting operation is completed, the current conduction to the electric motor is inhibited until the emergency situation (state in which power supply from the body side to the electric motor is inadequately performed) is canceled, and the completion state of the retracting operation (operation of retracting the MSB from the KTB) is maintained. For this reason, an electric capacity required for the emergency power source BEM can be suppressed to the requisite minimum.

In the device, the emergency power source (BEM) preferably has an electric capacity (electric energy capacity) required to decrease the pressing force (Fba) from the maximum design value to a first predetermined value (fb1).

According to this, the electric capacity of the emergency power source BEM cannot cope with the retracting operation performed twice or more, and is an electric capacity required to perform the retracting operation once. The configuration is configured in consideration that the emergency power source BEM is a power source which is used only when an inadequate state occurs in the body power source system (body power source itself or connection states of power lines, connectors, and the like). As a result, the emergency power source BEM can be further reduced in size. The emergency power source BEM is desired to be instantaneously charged. In terms of this, as the emergency power source BEM, an electric double-layer battery (capacitor) having a small internal resistance can be employed.

In this device, the control means (CTL) preferably temporarily stops current conduction to the electric motor (MTR) when the inadequate state is determined, restarts the current conduction to the electric motor (MTR) after the pressing force (Fba) decreases to a second predetermined value (fb2) or less, and drives the electric motor (MTR) to decrease the pressing force (Fba).

When the electric motor MTR is set in a free state (current conduction stop state), the holding torque of the electric motor MTR decreases to a certain value determined by the efficiency or the like of power transmission members GSK and NJB. For this reason, when the electric motor is set in a free state by the stop of current conduction to the electric motor, braking torque (i.e., pressing force) naturally decreases (without control) by restorative force (restoring force by elasticity) of the friction member, the caliper, and the like. In the configuration, after the pressing force naturally decreases as described above, the electric motor MTR is reversely rotated by using the emergency power source BEM to decrease the pressing force. As a result, in comparison with a "case in which the electric motor is reversely rotated by using the emergency power source immediately after the inadequate state is determined", a power consumption of the emergency power source BEM can be suppressed. The second predetermined value fb2 can be set to be a value larger than the certain value which is experimentally calculated.

When the device includes a voltage acquiring means (VLA) which acquires a voltage of the body power supply (BBD) as a first voltage (Vla), the control means (CTL) preferably changes the determination result from the adequate state (FLdg=0) into the inadequate state (FLdg=1) when the first voltage (Vla) is a predetermined voltage (vlx) or less.

According to this, it is determined by monitoring the voltage of the body power source whether the power supply state from the body power source BBD to the electric motor MTR is adequate (determination of whether the state is an adequate state or an inadequate state). In this case, switching of the determinations from the adequate state to the inadequate state is performed on the basis of the change of the detection value Vla of a voltage sensor for monitoring the voltage of the body power source. As a means for switching the determinations, not only an electronic means, an electric/mechanical means achieved by a relay or the like can be employed.

When the device includes, in addition to the voltage acquiring means (VLA), a "connector (CNC) for electrically connecting the body power source (BBD) to the electric motor (MTR)", the emergency power source (BEM) is preferably disposed in an electric path from the connector (CNC) to the electric motor (MTR), the control means (CTL) preferably includes a switching means (KRK) for selectively connecting an electric path from the body power source (BBD) to the electric motor (MTR) and an electric path from the emergency power source (BEM) to the electric motor (MTR), and the voltage acquiring means (VLA) is preferably disposed between the connector (CNC) and the switching means (KRK).

It is assumed that the connector is disordered (for example, contact failure). In the configuration described above, since the voltage acquiring means VLA is disposed (connected) between the connector CNC and the switching means KRK (the VLA acquires a voltage of an electric path between the CNC and the KRK), in this case, the voltage acquiring means VLA acquires the first voltage Vla having an abnormal value. Thus, also in this case, it can be reliably determined that a "power supply state from the body power source to the electric motor" is an inadequate state. In addition, in the configuration described above, since the emergency power source BEM is disposed (connected) in the electric path from the connector CNC to the electric motor MTR, also in this case, the electric path from the emergency power source to the electric motor is kept normal, and power supply from the emergency power source to the electric motor can be adequately performed.

BRIEF DESCRIPTION OF DRAWINGS

FIG. 1 is an entire configuration diagram of an electric braking device for vehicle according to an embodiment of the present invention.

FIG. 2 is an entire configuration diagram of an electronic control unit, a body power source, and a braking means shown in FIG. 1.

FIG. 3 includes a functional block diagram and an electric circuit diagram of a drive means when a motor with brush is employed.

FIG. 4 is a diagram for explaining electric power supply to an electric motor.

FIG. 5 is another diagram for explaining the electric power supply to the electric motor.

FIGS. 6(a) and 6(b) are time charts for explaining power supply assistance by a vehicle wheel power source.

FIG. 7 is a functional block diagram and an electric circuit diagram of another drive means when a motor with brush is employed.

FIG. 8 is a diagram for explaining an electric connection state of an emergency power source (vehicle wheel power source) and a power source management means.

FIGS. 9(a) and 9(b) are time charts for explaining operations of the emergency power source (vehicle wheel power source) and the power source management means.

DESCRIPTION OF EMBODIMENTS

An electric braking device for vehicle according to an embodiment of the present invention will be described below with reference to the accompanying drawings.

<Entire Configuration of Electric Braking Device for Vehicle According to Embodiment of the Present Invention>

FIG. 1 shows a mounting state of the electric braking device according to the embodiment of the present invention on a vehicle. The electric braking device gives braking torque to vehicle wheels depending on an operation amount of a braking operation member (for example, brake pedal) by a driver to generate braking force on the vehicle wheels so as to decelerate a traveling vehicle.

A body power source (first power source) BBD is disposed (fixed) on a vehicle body BDY. The body power source (accumulator or Battery) BBD supplies electric power to an electronic control unit ECU and a braking means (brake actuator) BRK. Furthermore, an alternator ALT is disposed on the vehicle body BDY. The body power source BBD is charged with the alternator ALT.

The electronic control unit ECU is disposed (fixed) on the vehicle body BDY. The electronic control unit ECU arithmetically operates a drive signal of an electric motor MTR on the basis of a braking operation amount Bpa and transmits the drive signal to a drive means (electronic circuit for driving the MTR) DRV in the BRK through a signal line (for example, a serial communication bus) SCB. The electric power for driving the electric motor MTR is supplied from the body power source BBD to the DRV through the ECU and the body power line (first power line) PBD.

The drive means DRV is disposed (fixed) in a caliper CPR. The drive means DRV is a drive circuit (electric circuit) to drive the electric motor MTR, and includes the control means CTL, a bridge circuit HBR configured by a switching element (for example, a MOS-FET), a noise reduction circuit NIZ, and a vehicle wheel power source BWH. The control means CTL programmed in the DRV drives the switching element on the basis of a drive signal (for example, target pressing force Fbt) transmitted from the ECU, and controls the rotating direction and rotating power of the MTR.

At the request of normal braking (when the vehicle wheel power source BWH adequately functions), electric power to drive the electric motor MTR is supplied from the vehicle wheel power source (second power source) BWH to the HBR through the vehicle wheel power line (second power line) PWH (i.e., to the MTR through the switching element).

The vehicle wheel power source (second power source) BWH is charged by current conduction from the body power source (first power source) BBD in a normal traveling state (when braking is not required). This charging (power supply from the BBD to the BWH) is performed through the ECU and the body power line (first power line) PBD. A signal line (for example, serial communication bus) SCB and the body power line PBD are collectively called "wires (wire harnesses)".

Power line communication which also uses the body power line PBD as the signal line (communication line) SCB can be employed. In this case, the SCB is integrated with the PBD (i.e., the SCB is omitted), the drive signal of the electric motor is superposed on the PBD, and the superposed drive signal is transmitted to the DRV. In this case, the power line communication is also called power line carrier communication (PLC, Power Line Communication). By employing the power line communication, a communication system which performs high-speed data communication by using the power source wires PBD can be obtained.

One of suspension arms (for example, an upper arm UAM and a lower arm LAM) is attached to the body BDY of the vehicle, and the other is attached to a knuckle NKL. A coil spring SPR and a shock absorber SHA are attached to the suspension arms or the knuckle NKL. The vehicle wheel WHL is suspended on the body BDY by the coil spring SPR and a shock absorber SHA. The suspension arms SPR, NKL, and SHA are members constituting a known suspension device.

A hub bearing unit HBU is fixed to the knuckle NKL. A hub bearing in the hub bearing unit HBU supports the vehicle wheel WHL. A rotating member (brake disk) KTB is fixed to the vehicle wheel WHL, and rotates integrally with the WHL (i.e., the rotating shaft of the KTB is the same as the rotating shaft of the WHL).

A mounting bracket MTB is fixed to the knuckle NKL with fastening members (for example, bolts) TK1 and TK2 (not shown). The caliper CPR is attached to the MTB through slide pins GD1 and GD2 (not shown). The brake caliper CPR is a floating caliper which is configured to sandwich the rotating member (brake disk) KTB through the two friction member (brake pad) MSB. More specifically, slide pins GD1 and GD2 are fixed to the mounting bracket MTB, and a pressing member (piston) PSN in the caliper CRP is slid with the electric motor MTR along the GD1 and GD2 toward the rotating member KTB.

<Entire Configuration of Electric Control Unit ECU, Body Power Supply BBD, and Braking Means BRK>

As shown in FIG. 2, a vehicle having this electric braking device includes a braking operation member BP, an electronic control unit ECU, a body power source (accumulator or the like) BBD, and a braking means (brake actuator) BRK. In this case, the ECU and the BRK are connected to each other by the signal line (signal line) SCB and a body power line (power line) PBD through an ECU-side connector CNB and a BRK-side connector CNC. The ECU supplies a drive signal of the MTR and electric power to the BRK.

A braking operation member (for example, brake pedal) BP is a member operated by a driver to decelerate the vehicle. On the basis of an operation amount of the BP, the braking means (brake actuator) BRK adjusts braking torque of the vehicle wheel WHL and generates braking force on the vehicle wheels WHL to decelerate the traveling vehicle.

A braking operation amount acquiring means BPA is disposed on the braking operation member BP. The braking operation amount acquiring means BPA acquires (detects) an operation amount (braking operation amount) Bpa of the braking operation member BP operated by a driver. As the braking operation amount acquiring means BPA, a sensor (pressure sensor) for detecting a pressure of a master cylinder (not shown) and sensors (force-on-brake-pedal sensor and brake pedal stroke sensor) for detecting operation force and/or a displacement of the braking operation member BP are employed.

Thus, the braking operation amount Bpa is arithmetically operated on the basis of at least one of a master cylinder pressure, force on-brake-pedal, and a brake pedal stroke. The braking operation amount Bpa is input to the electronic control unit ECU. The Bpa is arithmetically operated or acquired by another electronic control unit, and the arithmetically operated value (signal) can be transmitted to the ECU through a communication bus.

A body power source (first power source) BBD is a power source fixed to the vehicle body BDY. The body power source BBD supplies electric power to the electronic control unit ECU disposed on the body side. As the body power source BBD, a chargeable secondary battery (also referred to as an accumulator or a rechargeable battery) can be employed. In this case, the secondary battery is one of batteries (chemical batteries) for converting chemical energy of a material into a DC electric power with a chemical reaction. The secondary battery accumulates electricity by charging and can be repeatedly used.

More specifically, the secondary battery converts internal chemical energy into electric energy in a discharging process and causes a current to flow in an opposite direction of the direction in the discharging process to convert electric energy into chemical energy so as to accumulate energy. The body power supply BBD is charged with the alternator (electric generator) ALT when a charging amount (accumulated energy) of the power source decreases.

The electronic control unit ECU outputs a target value (drive signal) Fbt to drive the electric motor MTR to the drive unit DRV. Electric power to drive the MTR is supplied to the DRV through the ECU. More specifically, the ECU includes a connector CNB disposed therein, and the serial communication bus SCB and the body power line PBD are connected to the drive means DRV through the CNB. A target calculating means TRG programmed in the electronic control unit ECU arithmetically operates the target value (target pressing force) Fbt, and the Fbt is transmitted to the DRV through the SCB. Electric power (current) from the body power source BBD is supplied to the drive means DRV or the like through the ECU while passing through the PBD.

[Target Calculating Means TRG]

A target calculating means TRG (control algorithm) to arithmetically operate the target value (target pressing force) Fbt of the braking means BRK is programmed in the electronic control unit ECU.

The target calculating means TRG is a control algorithm which includes a command pressing force calculation block FBS, an antiskid control block ABS, a traction control block TCS, a vehicle stability control block ESC, and a target pressing force calculation block FBT.

In the command pressing force calculation block FBS arithmetically operates a command pressing force Fbs of each of the vehicle wheels WHL on the basis of the braking operation amount Bpa and a command pressing force calculating characteristic (calculation map) CHfb which is set in advance. The Fbs is a target value of pressing force with which the friction member (brake pad) MSB presses the rotating member (brake disk) KTB in the electric braking means BRK.

In the antiskid control block ABS arithmetically operates a target pressing force Fabs to execute known antiskid control (Anti-Skid Control) on the basis of an acquired result (vehicle wheel speed) of a vehicle wheel speed acquiring means (not shown). More specifically, the antiskid control target pressing force Fabs is a target value of pressing force to prevent the wheels from being locked.

The traction control block TCS arithmetically operates a target pressing force Ftcs to execute known traction control (Traction Control) on the basis of an acquired result (vehicle wheel speed) of the vehicle wheel speed acquiring means (not shown). More specifically, the traction control target pressing force Ftcs is a target value of pressing force to suppress the wheels from spinning (over-rotation).

The vehicle stability control block ESC arithmetically operates a target pressing force Fesc to execute known vehicle stability control (Vehicle Stability Control) on the basis of an acquired result (yaw rate) of a vehicle behavior acquiring means (for example, a yaw rate sensor (not shown)). More specifically, the vehicle stability control target pressing force Fesc is a target value of pressing force to suppress a vehicle from excessively understeering and/or oversteering.

The target pressing force calculation block FBT arithmetically operates a final target pressing force Fbt on the basis of the command pressing force Fbs, the antiskid control target pressing force Fabs, the traction control target pressing force Ftcs, and the vehicle stability control target pressing force Fesc. More specifically, one of the Fabs, the Ftcs, and the Fesc is selected, and the Fbs is corrected on the basis of the selected one to arithmetically operate the Fbt. A selecting order of the Fabs, Ftcs, and Fesc is determined on the basis of a traveling state of the vehicle and a state of a vehicle wheel. When the corresponding vehicle wheel is not a drive wheel (disconnected from a drive train), the Ftsc is not arithmetically operated.

The target pressing force (signal) Fbt arithmetically operated by the target calculating means TRG is transmitted to the braking means BRK (more specifically, the drive circuit DRV) fixed to the vehicle wheel through the ECU-side connector CNB and the signal line (serial communication bus) SCB.

[Braking Means BRK]

The braking means (braking actuator) BRK includes the brake caliper (floating caliper) CPR, the pressing member (brake piston) PSN, the electric motor (brush motor or brushless motor) MTR, a position detection means MKA, a decelerator GSK, a shaft member SFT, a screw member NJB, a pressing force acquiring means FBA, and the drive means (drive circuit of the MTR) DRV.

The brake caliper CPR is a floating caliper which is configured to sandwich the rotating member (brake disk) KTB through the two friction members (brake pads) MSB. In the caliper CPR, the pressing member PSN is slid to be moved forward or backward toward the rotating member KTB. In the caliper CPR, a key groove KYM is formed to extend in a direction along the rotating shaft (shaft axis Jsf) of the shaft member SFT.

The pressing member (brake piston) PSN presses the friction members MSB against the rotating member KTB to generate friction force. The key member KYA is fixed to the pressing member PSN. The key member KYA is fitted in the key groove KYM to regulate rotating motion of the pressing member PSN around the shaft axis. However, linear motion in the direction (longitudinal direction of the key groove KYM) along the shaft axis is allowed.

The electric motor MTR generates power to press the friction members MSB against the rotating member KTB. More specifically, the electric motor MTR drives the pressing member PSN. That is, an output (rotating power around a motor shaft Jmt) from the electric motor MTR is transmitted to the shaft member SFT through the decelerator GSK, the rotating motion (torque around the shaft axis Jsf) of the SFT is converted into linear motion (thrust in the direction along a pressing shaft Jps) by a motion conversion member (for example, the screw member) NJB, and the linear motion is transmitted to the pressing member PSN. The pressing member (brake piston) PSN moves forward or backward toward the rotating member (brake disk) KTB. The movement of the PSN adjusts pressing force (pressing force) Fba with which the friction members (brake pads) MSB are pressed against the rotating member KTB. Since the rotating member KTB is fixed to the vehicle wheel WHL, friction force is generated between the friction members MSB and the rotating member KTB to adjust braking force of the vehicle wheel WHL, for example, so as to decelerate the traveling vehicle. As the electric motor MTR, a motor with brush or a brushless motor is employed.

In the rotating direction of the electric motor MTR, a normal rotating direction corresponds to a direction (direction in which pressing force increases and braking torque increases) in which the friction members MSB come close to the rotating member KTB, and a reverse direction corresponds to a direction (direction in which the pressing force decreases and the braking torque decreases) in which the friction members MSB come away from the rotating member KTB. An output from the electric motor MTR is determined on the basis of the target current conduction amount Imt arithmetically operated by the target calculating means TRG. More specifically, the sign of the target current conduction amount Imt is positive (Imt>0), the electric motor MTR is driven in the normal direction. When the sign of the Imt is negative (Imt<0), the electric motor MTR is driven in the reverse direction. The rotating power of the electric motor MTR is determined on the basis of the magnitude (absolute value) of the target current conduction amount Imt. More specifically, output torque of the electric motor MTR is large when the absolute value of the target current conduction amount Imt is large, and the output torque is small when the absolute value of the target current conduction amount Imt is small.

The position acquiring means (for example, a rotating angle sensor) MKA acquires (detects) a position (for example, a rotating angle) Mka of the rotor (rotator) of the electric motor MTR. The position acquiring means MKA is disposed in the electric motor MTR coaxially with the rotator and a commutator (that is, disposed on the motor shaft Jmt coaxially with the MTR).

The decelerator GSK decreases a rotating speed in the power of the electric motor MTR to output the power to the shaft member SFT. More specifically, the rotating output (torque) of the MTR is increased depending on a reduction ratio of the decelerator GSK to obtain rotating force (torque) of the shaft member SFT. For example, the GSK includes a small-diameter gear SKH and a large-diameter gear DKH. As the GSK, in place of a gear transmission mechanism, a wrapping transmission mechanism such as a belt or a chain or a friction transmission mechanism can be employed. The shaft member SFT is a rotating shaft member which transmits rotating power transmitted from the decelerator GSK is transmitted to the screw member NJB. An end of the shaft member SFT is spherically machined to function as a universal joint. The universal joint compensates for an influence of swing motion (head-swing motion) of the pressing member PSN generated when the friction member MSB slides.

The screw member NJB is a power conversion member which converts rotating power of the shaft member SFT into linear power. More specifically, the screw member NJB is a rotating/linear conversion mechanism. The screw member NJB includes a nut member NUT and a bolt member BLT. The screw member NJB has reversibility (having reverse efficiency) and can bidirectionally transmit power. More specifically, when braking torque is increased (when pressing force Fba is increased), power is transmitted from the shaft member SFT to the pressing member PSN through the screw member NJB. In contrast to this, when the braking torque is decreased (when the pressing force Fba is decreased), power is transmitted from the pressing member PSN to the shaft member SFT through the screw member NJB (reverse efficiency is larger than "0").

The screw member NJB is configured by a skid screw (trapezoidal screw or the like) which transmits power with "skidding". In this case, a female screw (internal screw) MNJ is disposed at the nut member NUT. A male screw (external screw) ONJ is disposed at the bolt member BLT, and the NUT and the MNJ are meshed with each other. Rotating power (torque) transmitted from the shaft member SFT is transmitted as linear power (thrust) of the pressing member PSN through the screw members NJB (ONJ and MNJ).

In place of the skid screw, as the screw member NJB, a rolling screw (ball screw or the like) which transmits power with "rolling" can be employed. In this case, ball grooves are formed in the nut member and the bolt member. The power is transmitted through balls (steel balls) fitted in the ball grooves. In place of the screw member NJB, as a power conversion member to convert rotating motion into linear motion, a conversion mechanism such as a ball ramp member, a rotating wedge member, or a rack-and-pinion member can be employed.

The pressing force acquiring means FBA acquires (detects) reaction force (counteraction) of pressing force (press force) Fba with which the pressing member PSN presses the friction members MSB. A strain body is formed in the FBA, and the strain is detected by a strain detection element to obtain the Fba. For example, as the strain detection element, an element using a change in electric resistance (strain gauge), an element using ultrasonic, or the like can be used. The FBA is disposed between the shaft member SFT and the caliper CPR and fixed to the caliper CRP. The detected pressing force Fba is input to the drive means DRV.

The drive means DRV is fixed in the caliper CPR, and drives and controls the electric motor MTR on the basis of the target pressing force Fbt. The DRV includes the control means CTL, the vehicle wheel power source BWH, the bridge circuit HBR, and the like. The DRV will be described later in detail.

[Connectors CNB and CNC and Wires SCB and PBD]

The connector CNC is disposed on a surface of the caliper CPR. From the connector CNC, drive power of the electric motor MTR and a drive signal (target pressing force Fbt) of the MTR are taken into the drive means DRV. The target signal Fbt is supplied to the BRK-side connector (wheel-side connector) CNC through the signal line SCB, and the electric power is supplied to the BRK-side connector CNC through the body power line PBD.

As in the drive means DRV, the connector CNB is disposed in the electronic control unit ECU. The signal line SCB and the power line PBD are connected to the ECU through the ECU-side connector (body-side connector) CNB. More specifically, the electronic control unit ECU (disposed on the body BDY) and the drive circuit DRV (disposed on the vehicle wheel WHL) are connected to each other through the wires (signal line SCB and power line PBD) repeated by the ECU-side connector (body-side connector) CNB and the BRK-side connector (wheel-side connector) CNC. In other words, the signal line SCB transmits the target pressing force Fbt from the ECU to the DRV through the connectors CNB and CNC. The power line PBD supplies electric power for driving the electric motor MTR from the ECU to the DRV through the connectors CNB and CNC in a normal state. As the PBD, a twisted pair cable (Twisted Pair Cable) formed by twisting two electric wires can be employed.

<Drive Means DRV>

The drive means (drive circuit) DRV will be described below in detail with reference to FIG. 3. The drive means DRV controls an current conduction state to the electric motor MTR on the basis of the target pressing force Fbt and adjusts an output from the MTR (that is, braking torque generated by the braking means BRK). FIG. 3 is an example of the drive means DRV when a motor with brush (to also be simply referred to as a brush motor) is employed as the electric motor MTR. The drive means DRV includes the vehicle wheel power source BWH, the control means CTL, a bridge circuit HBR formed by a plurality of switching elements (power transistors) S1 to S4, the noise reduction circuit NIZ, a current conduction amount acquiring means IMA, and the connector CNC.

As the electric motor MTR, a motor with brush (to also be simply referred to as a brush motor) is employed. The motor with brush is also called a commutator motor (Commutator Motor). In the electric motor, currents flowing in an armature (electromagnet obtained by a coil) are switched depending on rotating phases by a mechanical commutator (commutator) CMT and a brush BLC. More specifically, the commutator CMT and the brush BLC constitute a mechanical rotary switch, and a current to a coil circuit is alternatively inverted. In the motor with brush, a permanent magnet configures a stator side, and the coil circuit (electromagnet) configures a rotator (rotor) side. The brush BLC is brought into contact with the commutator CMT to supply electric power to the coil circuit (rotator). The brush BLC is pressed against the commutator CMT with a spring (elastic body), and the rotation of the CMT commutates a current.

[Vehicle Wheel Power Source BWH]

The vehicle wheel power source (second power source) BWH is disposed in the drive means DRV. More specifically, the vehicle wheel power source BWH is a power source disposed on the vehicle wheel side (inside the braking means BRK) independently of the body power source (first power source) BBD. The vehicle wheel power source BWH is connected to the bridge circuit HBR (i.e., the electric motor MTR) by the vehicle wheel power line PWH. Since the BWH and the HBR are adjacent to each other, a bus bar (Bus Bar, which is a metal bar functioning as a conductor) is employed as the vehicle wheel power line PWH. For this reason, a wiring resistance causes small voltage drop, and the electric motor MTR can be efficiently driven. Furthermore, since the bus bar need not be covered with an insulator, high heat radiation performance can be achieved, and the power source can be easily cope with a large current.

The vehicle wheel power source (second power source) BWH has an electric capacity corresponding to a braking operation performed twice or more. For example, the electric capacity is regulated to a necessary and sufficient electric capacity for repeating a cycle starting with an operation at the maximum speed of the vehicle and finished with an operation at the stop of the vehicle twice to three times. When the vehicle wheel power source BWH supplies electric power to the electric motor MTR except in a case in which power supply may be shortened (when the BWH is disordered and when sudden braking is requested). The BWH is charged with the body power supply BBD (or the alternator ALT of the vehicle) when non-braking is requested (the braking operation member BP is not operated by a driver). Since the BWH is a power source disposed on the vehicle wheel, the BWH having an energy capacity (storage capacity) smaller than that of the BBD can be employed.

As the vehicle wheel power supply BWH, an electric double-layer capacitor (to also be referred to as an ultra capacitor or a super capacitor) can be employed. The electric double-layer capacitor (EDLC, Electric Double-Layer Capacitor) uses an electric double-layer (when a potential is given to a system in which charged particles can relatively freely move, motion of the charged particles according to an electric field results in boundary arrangement of pairs of positive and negative charged particles in layers). Since the electric double-layer capacitor has a small internal resistance and rapidly charged/discharged, the electric double-layer capacitor is suitable for the BWH.

[Control Means CTL]

The control means CTL, on the basis of the target pressing force (target value) Fbt, controls an actual current conduction amount (finally, the magnitude and direction of a current) to the electric motor MTR. A part of the control means CTL is a control algorithm which is programmed in the CPU (Central Processing Unit) in the DRV. The CTL includes a command current conduction amount calculation block IST, a pressing force feedback control block IFT, a current conduction amount adjustment calculation block IMT, a pulse width modulation block PWM, a switching control block SWT, and a power source management means DGK.

The command current conduction amount calculation block IST arithmetically operates the command current conduction amount Ist on the basis of calculation characteristics (calculation maps) CHs1 and CHs2 of a command current conduction amount set in advance. The Ist is a target value of a current conduction amount to the electric motor MTR to cause the electric braking means BRK to achieve the target pressing force Fbt. The calculation map of the Ist is configured by two characteristics CHs1 and CHs2 in consideration of the hysteresis of the electric braking means BRK. The characteristic CHs1 corresponds to a case in which the pressing force is increased, and the characteristic CHs2 corresponds to a case in which the pressing force is decreased. For this reason, the characteristic CHs1 is set to output the command current conduction amount Ist relatively larger than that of the characteristic CHs2.

In this case, the current conduction amount is a state amount (variable) to control output torque from the electric motor MTR. Since the electric motor MTR output a torque which is in almost proportion to a current, a current target value of the electric motor MTR can be used as the target value of the current conduction amount. When a voltage supplied to the electric motor MTR is increased, the current is consequently increased. For this reason, a supply voltage value is used as the target current conduction amount. Furthermore, since the supply voltage value can be adjusted by a duty ratio in pulse width modulation (PWM, Pulse Width Modulation), the duty ratio can be used as the current conduction amount.

The pressing force feedback control block IFT arithmetically operates a pressing force feedback current conduction amount Ift on the basis of the target pressing force (target value) Fbt and the actual pressing force (actual value) Fba. Although the command current conduction amount Ist is arithmetically operated as a value corresponding to the target pressing force Fbt, a variation in efficiency of the electric braking means BRK may cause an error (stationary error) between the target pressing force Fbt and the actual pressing force Fba. The pressing force feedback current conduction amount Ift is arithmetically operated on the basis of a deviation (pressing force deviation) ΔFb between the target pressing force Fbt and the actual pressing force Fba and a calculation characteristic (calculation map) CHp set in advance, and is determined to decrease the error. The actual pressing force Fba is acquired (detected) by a pressing force acquiring means FBA (will be described later).

An inertia compensation current conduction amount calculation block IKT arithmetically operates, on the basis of the target pressing force Fbt, an inertia compensation current conduction amount (target value) Ikt to compensate for an influence of inertia of a "force transmission mechanism operated in relation to generation of braking torque from the electric motor MTR to the friction member MSB" (braking means BRK, in particular, the electric motor MTR). In this case, the inertia is a moment of inertia in a rotating motion or an inertia mass in a linear motion. More specifically, the inertia compensation current conduction amount Ikt is arithmetically operated when motion (rotating motion) is accelerated from a state in which the electric motor stops or slowly operates and when the electric motor suddenly decelerates and stops from a state in which the electric motor operates (rotating motion). The Ikt improves the responsiveness of generation of pressing force, an overshoot of the pressing force is suppressed in deceleration of the MTR, and the convergence of the pressing force can be improved.

The inertia compensation current conduction amount calculation block IKT arithmetically operates the inertia compensation current conduction amount Ikt on the basis of a second order differential value of the target pressing force Fbt. That is because the Fbt is in proportion to a rotating angle Mka of the MTR and torque for starting the MTR is in proportion to a second order differential value of the Mka. The Ikt can be arithmetically operated on the basis of a variation with time of the Fbt and a calculation map set in advance. The Ikt is arithmetically operated such that the current conduction amount is increased when the MTR is accelerated and the current conduction amount is decreased when the MTR is decelerated.

The current conduction amount adjustment calculation block IMT arithmetically operates the target current conduction amount Imt which is a final target value to the electric motor MTR. In the IMT, the command current conduction amount Ist is adjusted by the pressing force feedback current conduction amount Ift and the inertia compensation current conduction amount Ikt to arithmetically operate the target current conduction amount Imt. More specifically, when the MTR is accelerated, the feedback current conduction amount Ift and the inertia compensation current conduction amount Ikt are added to the command current conduction amount Ist, and the resultant value is arithmetically operated as the target current conduction amount Imt (Imt=Ist+Ift+Ikt). On the other hand, when the MTR is decelerated, the feedback current conduction amount Ift is added to the command current conduction amount Ist, and the inertia compensation current conduction amount Ikt is subtracted to arithmetically operate the final target current conduction amount Imt (Imt=Ist+Ift−Ikt). On the basis of the sign (positive or negative of the value) of the target current conduction amount Imt, a rotating direction (normal rotating direction in which the pressing force increases or a reverse rotating direction in which the pressing force decreases) of the electric motor MTR is determined, and an output (rotating power) of the electric motor MTR is controlled on the basis of the magnitude of the target current conduction amount Imt.

The pulse width modulation block PWM arithmetically operates a command value (target value) to perform a pulse width modulation (PWM, Pulse Width Modulation) on the basis of the target current conduction amount Imt (in a normal state). More specifically, the pulse width modulation block PWM determines, on the basis of the target current conduction amount Imt and the characteristic (calculation map) set in advance, a duty ratio Dut (ratio of ON/OFF times) of pulse widths. In addition, the PWM determines a rotating direction of the MTR on the basis of the sign (positive sign or negative sign) of the Imt. For example, the rotating direction of the electric motor MTR is set as a positive (plus) value for the normal direction and as a negative (minus) value for the reverse direction. Since a final output voltage is determined by the input voltage (power source voltage) and the duty ratio Dut, the PWM determines a rotating direction of the MTR and a current conduction amount to the MTR (i.e., an output from the MTR).

The pulse width modulation block PWM executes so-called current feedback control. In this case, a detection value (actual current conduction amount to the electric motor MTR, for example, an actual current) Ima is input to the PWM. On the basis of a deviation ΔIm between the target current conduction amount Imt and the actual current conduction amount Ima, the duty ratio Dut is corrected (finely adjusted). With this current feedback control, accurate motor control can be achieved.

The switching control block SWT outputs a drive signal to the switching elements (S1 to S4) configuring the bridge circuit HBR on the basis of the duty ratio (target value) Dut. The drive signal designates whether each of the switching elements is in a conducting state or a non-conducting state. More specifically, when the electric motor MTR is driven in the normal direction on the basis of the duty ratio Dut, the S1 and the S4 are set in the conducting state (on state), the S2 and the S3 are set in the non-conducting state (OFF state), and the conducting/non-conducting states of the S1 and the S4 are switched depending on a current conduction time (current conduction period) corresponding to the Dut. Similarly, when the MTR is driven in the reverse direction, the S1 and the S4 are controlled to the non-conducting state (OFF state), and the S2 and the S3 are controlled to the conducting state (ON state), and the conducting states (ON/OFF switching cycle) of the S2 and the S3 are adjusted on the basis of the duty ratio Dut. When the Dut is large, a current conduction time per unit time is elongated, and a larger current is caused to flow in the MTR. For example, the corresponding switching element is always in the conducting state when Dut=100% is designated, and the switching element is in the non-conducting state when Dut=0% is designated.

The power source management means DGK manages a power supply state to the electric motor MTR, monitors the state of the vehicle wheel power source BWH, and keep the charging state of the vehicle wheel power source adequate. The power source management means DGK includes switching means (switch group) SWX, a charging state amount acquiring means JDA, and a determination calculation block HNT. The switching means SWX (part of the electric circuit) includes a plurality of switches (SWc or the like) to switch connection states in the electric circuit. The charging state amount acquiring means JDA acquires (detects) an actual value Jda (for example, actual voltage value) of the charging state of the BWH. A determination calculation block HNT (control algorithm) adjusts the connection state of the SWX on the basis of various state amounts (Imt, Jda, and the like) to control a power supply state to the bridge circuit HBR and to manage the charging state of the BWH.

The determination calculation block HNT, on the basis of the target current conduction amount Imt, switches the switching means SWX to adjust a power source (i.e., the power source to the MTR). More specifically, when the vehicle wheel power source BWH adequately functions by the HNT, a power supply from the body power source BBD is blocked, and power supply to the MTR is performed mainly by the BWH (for example, only the BWH). Since the BWH is a power source disposed on a vehicle wheel, as the BWH, a power source having an energy capacity (storage capacity) smaller than that of the BBD is employed. For this reason, the power supply capability of the BWH is limited.

A power supply of the BWH which deteriorates in performance is performed by the BBD and the BWH (composite power supply) or by the BBD (single power supply by the BBD) alone depending on the situations.

The power source management means DGK causes the charging state amount acquiring means JDA to monitor a storage state of the vehicle wheel power source BWH, and charges the vehicle wheel power source BWH when the storage state is deteriorated. For example, The JDA detects a voltage Jda of the BWH. When the Jda is lower than a voltage threshold value (predetermined value set in advance), charging of the BWH is started. As conditions for start of charging, a condition in which "the braking operation member BP is unoperated (non-braking state is positive)" is added. This condition is determined on the basis that "the braking operation amount Bpa is smaller than a predetermined value bpx". Alternatively, a stop switch STP (ON/OFF switch) is disposed on the braking operation member BP, and the determination can be made on the basis of the Stp (Stp shows an ON state). The vehicle wheel power source BWH is charged with the BBD (or the alternator ALT of the vehicle) at the request of non-braking. The request of non-braking is that braking torque given to a vehicle wheel is not requested, for example, that the braking operation member BP is not operated by a driver.

[Bridge Circuit HBR and Noise Reduction Circuit NIZ]

The switching elements S1 to S4 are elements which can turn ON (conducting)/OFF (non-conducting) a part of the electric circuit. For example, as the switching elements, a MOSFET and an IGBT are used. The switching elements S1 to S4 configure the bridge circuit HBR. In this case, the bridge circuit is a circuit which changes current conduction directions to the electric motor with a single power supply without requiring a bidirectional power source and can control a rotating direction (normal direction or reverse direction) of the electric motor. The bridge circuit is also called an H bridge circuit or a full-bridge circuit. The switching elements S1 to S4 are driven with the control means CTL (signal from the switching control block SWT). The conducting/non-conducting states of the switching elements are switched to adjust the rotating direction (normal direction or reverse direction) and the output torque (magnitude of a current conduction amount) of the electric motor MTR. In this case, the normal direction of the MTR is a rotating direction in which the friction member MSB is caused to come close to the rotating member KTB, the braking torque is increased, and the deceleration of a traveling vehicle is increased. The reverse direction of the MTR is a rotating direction in which the MSB is got away from the KTB, the braking torque is decreased, and the deceleration of the traveling vehicle is decreased.

When the electric motor MTR is required to have a large output, a large current is caused to flow in the switching elements S1 to S4. At this time, since the switching elements S1 to S4 generate heat, a heat-radiation plate (heat sink) can be disposed on the S1 to S4. More specifically, a metal plate (for example, aluminum plate) having good heat conductivity can be fixed to the S1 to S4.

In the drive circuit DRV, a noise reduction circuit (stabilization circuit) NIZ to stabilize supplied electric power (i.e., to reduce a variation in voltage) is disposed. The noise reduction circuit NIZ is a so-called LC circuit (also called an LC filter), and is configured by a combination of at least one inductor (coil) IND and at least one condenser (capacitor) CND. For example, as the NIZ, first and second capacitors CND1 and CND2 and the inductor IND are combined to each other to form a low-pass filter (π-type filter). More specifically, the π-type low-pass filter is a filter configured by the two capacitors CND1 and CND2 which are parallel with a line and one series inductor, and is a so-called Chebychev low-pass LC filter. In general, since the inductor is generally more expensive than a condenser (capacitor), the π-type filter is employed to suppress parts cost and to obtain preferable performance. In addition, as the noise reduction filter NIZ, in place of the π-type low-pass filter, a T-type low-pass filter (configured by two series inductors and one parallel capacitor) can be employed.

The current conduction amount acquiring means (for example, a current sensor) IMA is disposed on the drive circuit DRV. The current conduction acquiring means IMA acquires (detects) the actual current conduction amount (for example, a current actually flowing in the electric motor MTR) Ima to the electric motor MTR.

[Electric Motor MTR]

As the electric motor MTR, in place of the motor with brush, a brushless motor can be employed. The brushless motor is also called a commutatorless motor (brushless DC motor or Brushless Direct Current Motor). In the electric motor, in place of a mechanical commutator CMT of the motor with brush, an electric circuit commutates a current. The brushless motor has a structure in which a rotator (rotor) and a stator are a permanent magnet and a coil circuit (electromagnet), respectively. A rotational position Mka of the rotor is detected, and the switching elements are switched depending on the Mka to commutate a supply current. The position Mka of the rotator is detected by a position acquiring means MKA disposed in the electric motor MTR.

When the brushless motor is employed, the bridge circuit HBR of the drive means DRV is constituted by six switching elements. As in the motor with brush, on the basis of the duty ratio (target value) Dut determined by the pulse width modulation block PWM, the conducting states/non-conducting states of the switching elements constituting the bridge circuit HBR are controlled.

In the brushless motor, the position acquiring means MKA acquires the rotor position (rotational angle) Mka of the electric motor MTR. In the switching control block SWT, on the basis of the actual position Mka, six switching elements constituting a 3-phase bridge circuit are controlled. The switching elements sequentially switch the directions (i.e., excitation directions) of U-phase, V-phase, and W-phase coil current conduction amounts of the bridge circuit to drive the MTR. A rotating direction (normal or reverse direction) of the brushless motor is determined by a relationship between the rotor and an excitation position.

First Embodiment of Power Source Management Means Dgk

A first embodiment of an electric connection between the body power source BBD and the vehicle wheel power source BWH and the power source management means DGK (part of the CTL) which manages the power sources BBD and BWH will be described below with reference to FIG. 4.

The body power source (first power source) BBD is disposed on the vehicle body BDY. Furthermore, the alternator ALT which generates electric power to charge the BBD is disposed on the BDY. The alternator ALT is an electric generator driven by a power source such as an engine. When a storage amount (charging amount) of the body power source BBD decreases, electric power generated by the ALT is supplied to the BBD through a diode Da to charge the BBD. Electric powers (currents) from the ALT and the BBD are supplied to the drive circuit DRV through a diode Db. Thus, the alternator ALT is a pair of the body power source. When the alternator ALT generates electric power, the electric power is also supplied to the DRV, and the BBD and the ALT serve as sources (body power sources) for supplying electric power (current) to the DRV.

The power supply from the body power source BBD or the like to the drive means DRV is performed by the body power line PBD. In this case, as the power line PBD, a twisted pair cable (Twisted Pair Cable which is a wire obtained by twisting two pairs of wires) can be employed. The PBD is connected to the drive means DRV through the connector (body-side connector) CNB disposed on the ECU.

The drive means (drive circuit) DRV is disposed in the caliper CPR fixed to the vehicle wheel WHL. The connector (wheel-side connector) CNC is disposed on the drive means DRV, and electric power (current) is supplied to the DRV through the CNC. In the drive means DRV, the control means CTL is programmed, and the noise reduction circuit NIZ, the bridge circuit HBR (S1 to S4), the vehicle wheel power source BWH, the DC-DC converter (to also be simply referred to as a converter) DCC, and the power source management means DGK (part of CTL) which manages the DC-DC converter DCC are disposed. All these components are disposed in the CPR (fixed on the vehicle wheel side).

The vehicle wheel power source BWH receives electric power from the body power source BBD or the like through the body power line PBD and the vehicle wheel power line PWH. In this case, the body power line PBD and the vehicle wheel power line PWH correspond to a first electric path. The vehicle wheel power source BWH supplies electric power to the electric motor MTR through the vehicle wheel power line PWH (corresponding to a second electric circuit). For example, as the BWH, an electric double-layer capacitor (to also be simply referred to as a capacitor) is employed. Since the capacitor has an internal resistor lower than that of a secondary battery (rechargeable battery), rapid charging/discharging can be achieved. As the vehicle wheel power line PWH which is an electric power supply path from the BWH to the MTR, a bus bar can be employed. The employment of the bus bar makes complex terminal processing unnecessary and enables the power line to be easily disposed and to be suitable for supply of a large current.

The DC-DC converter DCC controls a DC voltage and converts a DC current of a certain voltage into a DC current of a voltage different from the certain voltage (step-up or step-down). More specifically, the converter (voltage conversion means) DCC changes an output voltage from the vehicle wheel power source BWH into a voltage suitable for driving of the electric motor MTR. As the DC-DC converter DCC, any one of types including a chopper control type, a switching control type, and a series regulator type can be employed.

The power source management means DGK controls (switches) connection states between the power sources (BBD, ALT, and BWH) and the bridge circuit HBR. The power source management means DGK includes the switching means SWX (collective term of the switches SWb and SWc), the determination calculation block HNT, and a charging state amount acquiring means JDA.

The switching means SWX (SWb and SWc), on the basis of calculation results (signals Csb and Csc) in the determination calculation block HNT, switches connection states in the electric circuit. More specifically, the switching means SWb and SWc are ON/OFF switches including two positions, i.e., a closed position (conducting state) and an open position (non-conducting state). The switching means SWX (SWb and SWc), on the basis of the drive signals Csb and Csc), selects any one of the two positions (closed state and open state).

The switching means (switch) SWb switches connection states between the body power source BBD and the electric motor MTR. When the closed position of the SWb is selected, the BBD and the MTR are connected to each other. When the open position is selected, the BBD and the MTR are disconnected from each other. At the request of non-braking (when generation of braking torque is not required), the connection state between the body power source BBD and the vehicle wheel power source BWH is switched by the switching means SWb and SWc to charge the vehicle wheel power source BWH. The switch SWc selects the closed position when the vehicle wheel power source BWH is charged, and selects the open position in the other cases. When the performance of the BWH is deteriorated (for example, voltage drop), the switching means SWb is set to the closed position, and the switching means SWc is set to the open position, so that minimum power supply to the MTR is secured by the BBD (and/or the ALT). Current conduction from the BBD to the BWH may be caused by a voltage difference. However, the open position of the SWc is selected, and the diode Dc can cut the current conduction from the BBD to the BWH. Even though the BWH deteriorates in performance, power supply from the BBD can secure the minimum current conduction amount to the MTR.

At the request of braking (for example, when a driver performs a braking operation, and when Bpa>0 is satisfied), the switching means SWb is set to the open position (non-conducting state), power supply from the body-side power source (at least one of the body power source BBD and the alternator ALT) is cut. Thus, power supply to the bridge circuit HBR (circuit for supplying electric power to the MTR) is performed by the vehicle wheel power source BWH alone (current path going through BWH→DCC→PWH→Dc→HBR→MTR in this order named). In this case, it is determined on the basis of the braking operation amount Bpa "whether braking is requested". For example, when Bpa bpx (threshold value) is satisfied, "at the request of braking" is determined, and, when Bpa<bpx is satisfied, "at the request of non-braking" is determined.

At the request of non-braking (for example, when a driver does not perform a braking operation and when Bpa=0 is satisfied), when the BWH needs to be charged, the switching means SWb and SWc are set to the closed positions (conducting states), electric power is supplied from the body-side power source (at least one of the body power source BBD and the alternator ALT) to the vehicle wheel power source BWH to charge the BWH (current path going through BBD→PBD→SWb→SWc→PWH→DCC→BWH in this order named).

The charging state amount acquiring means JDA acquires (detects) a state amount (charging state amount) Jda representing a charging state (storage state) of the vehicle wheel power source BWH. For example, the charging state amount acquiring means JDA acquires a voltage of the vehicle wheel power source BWH as the charging state amount Jda. Furthermore, the JDA acquires the temperature of the BWH as the Jda. A time elapsed from when the charging is started can be acquired as the Jda.

The power source management means DGK, on the basis of the charging state amount Jda, charges the vehicle wheel power source BWH. The charging amount of the BWH decreases such that electricity is lost with elapse of time by self-discharging. Thus, the determination calculation block HNT (part of the DGK) causes a current to flow from the BBD (or the ALT) to the BWH to accumulate (charge) electric charges in the BWH when an operator does not operate the braking operation member BP (for example, determined by checking a condition given by Bpa<pbx). More specifically, the drive signals Csb and the Csc from the HNT set the switches SWb and SWc to the closed positions to connect the vehicle wheel power source BWH to the body power source BBD and the alternator ALT. The HNT completes the charging operation when electric charges are sufficiently accumulated in the BWH (full-charging state). More specifically, the HNT switches the SWc from the closed position to the open position to cut the connections between the BWH and the BBD and between the BWH and the ALT.

A timing of the end of charging (full charging) is determined on the basis of the charging state amount Jda of the vehicle wheel power source BWH. For example, the voltage of the BWH is detected as the charging state amount Jda, and the full charging state can be detected on the basis of a change in voltage of the BWH. Furthermore, on the basis of the capacity and the charging/discharging time of the BWH, the full charging can be detected by arithmetic processing programmed in the determination calculation block HNT. Furthermore, the power source management means DGK can employ, as a charging method, at least one of $-\Delta V$ charging, temperature-control charging, dT/dt control charging, pulse charging, and trickle charging. In the $-\Delta V$ charging, when charging is further performed in a full-charging state, by using a phenomenon in which the voltage of a battery slightly decreases, the charging is performed on the basis of the change in voltage. In the temperature control charging, the temperature of the vehicle wheel battery BWH is detected as the charging state amount Jda, and charging is performed on the basis of an increase in temperature of the battery. In the dT/dt control charging, a derivative value (variation with time dJda of the Jda) of the temperature (increase) of the battery BWH, and charging is performed on the basis of dJda. In the pulse charging method, after a predetermined voltage is achieved by constant-current charging, the charging is continued by a pulse current. In the pulse charging, it is permitted that a cell voltage exceeds a predetermined voltage for only an extremely short time, and the cell voltage is finely monitored to suppress overcharging, and boost charging can be achieved. In the trickle (Trickle) charging method, a weak current which is too small to be loaded on the battery characteristic and to influence the battery characteristic is always supplied, thereby maintaining a full-charging state.

When a large current is to be supplied from the body power source BBD to the electric motor MTR disposed on a vehicle wheel, it is important that the electric resistance of the body power line PBD (part of the first electric path) is set lower. More specifically, it is important to employ a thick (having a large sectional area) conductive wire as the PBD. However, since the body and the vehicle wheel relatively move, when the thick conductive wire is employed, the flexibility (bending fatigue) of the wire may pose a problem. The vehicle wheel power source BWH is charged at the request of non-braking, the BWH supplies electric power to the MTR at the request of braking. More specifically, at the request of non-braking, the body power source BBD gradually (moderately, for a long time) supplies electric power to the vehicle wheel power source BWH to charge the vehicle wheel power source BWH. At the request of braking, a large current is supplied from the vehicle wheel power source BWH to the electric motor MTR through the vehicle wheel power line (second electric path, for example, bus bar) PWH. Thus, the boy power line (for example, twisted pair cable) PBD is not required to be caused to flow a large current corresponding to sudden braking. As a result, a thin (having a small sectional area) conductive wire can be employed as the body power line PBD to make it possible to improve the flexibility of the body power line PBD.

The determination calculation block HNT, on the basis of a state amount (braking state amount) Bja representing whether braking is required, outputs the drive signal Csb of the SWb and the drive signal Csc of the SWc to control the connection states of the switches SWb and SWc. More specifically, the positions of the switching means (switches) are selected on the basis of the designation signals Csb and Csc transmitted from the HNT. In this case, as the state amount Bja representing whether braking is required, at least one of the state amounts arithmetically operated on the basis of the braking operation amount Bpa. Since traction control and vehicle stability control operate even though a driver does not perform a braking operation, at least one of state amounts arithmetically operated on the basis of the control amounts Ftcs and Fesc can be employed as the braking state amount Bja. Thus, in a arithmetic operation process, at least one state amount of the state amounts (for example, Fbt and Imt) from the braking operation amount Bpa to the target duty ratio Dut can be employed as the braking state amount Bja. Furthermore, a stop switch STP which acquires the presence/absence of a braking operation is disposed in the braking operation member BP, and the Bja can be arithmetically operated on the basis of a signal Stp (ON signal or OFF signal) of the STP.

It is determined that "braking is required (braking request)" when the braking state amount Bja is a threshold value bj0 (predetermined value set in advance and value larger than "0") or more (Bja≥bj0). For example, when the target current conduction amount Imt transmitted from the IMT is a threshold value im0 or more, the "braking request" can be determined. At the request of braking, the closed position of the SWb and the open position of the SWc are selected. When braking is required, power supply from the body power source BBD is cut, and only the vehicle wheel power source BWH supplies electric power to the electric motor MTR. A power supply path used here is given by "BWH→DCC→PWH→Dc→HBR→MTR". In this case, the vehicle wheel power line PWH corresponds to the second electric path (path for connecting the vehicle wheel power source BWH and the electric motor MTR). In this case, by the open position of the switch SWb, power supply from the body power source BBD to the bridge circuit HBR can be cut.

When the braking state amount Bja is smaller than the threshold value bj0 (for example, the Bja is "0"), it is determined that "braking is unnecessary (non-braking request)". For example, when the target current conduction amount Imt is smaller than the threshold value im0, non-braking request can be determined. In addition, when the BWH must be charged (i.e., at the request of non-braking and in charging of the BWH), the closed position of the SWb and the closed position of the SWc are selected. In this case, a power supply path from the BBD to the BWH is given by "BBD (or ALT)→Db→PBD→SWb→SWc→PWH→DCC→BWH". In this case, the PBD and the PWH correspond to the first electric path (path for electrically connecting the body power source BBD to the vehicle wheel power source BWH).

When non-braking is requested and the BWH need not be charged, the closed position of the SWb and the closed position of the SWc are selected. A state in which braking is started is anticipated, and the HBR is connected to the BBD and the BWH such that power supply from at least one of the BBD and the BWH can be performed, and a standby state can be set. As a result, if the BWH decreases in function, the power supply from at least the BBD can be performed.

[In Charging of BWH and Response to Braking Request in Decrease in Performance of BWH]

In the middle of charging of the vehicle wheel power source BWH, braking may be requested. In this case, in the determination calculation block HNT, it is determined on the basis of the charging state amount Jda "whether power supply from the BWH can be performed". For example, it is determined that "power supply is possible" when the charging state amount Jda is a predetermined value jdx or more, and it is determined that "power supply is impossible" when the Jda is smaller than the predetermined value jdx.

When the storage capacity of the vehicle wheel power source BWH is sufficient, and when power supply to the MTR can be performed (when it is determined that "power supply is possible"), the SWb is changed from the closed position to the open position, and the power supply is performed through a path given by "BWH→DCC→PWH→Dc→HBR→MTR". On the other hand, when the storage capacity of the vehicle wheel power source BWH is insufficient, and when power supply cannot be performed (it is determined that "power supply is impossible"), the closed position of the SWb is maintained, and the SWc is changed form the closed position to the open position. Thus, the power supply is performed through a path given by "BBD→Db→PBD→SWb→HBR→MTR". Furthermore, since the BWH and the HBR are disconnected from each other by the diode Dc and the open position of the switch SWc, current conduction from the BBD to the BWH is prevented, and minimum current conduction to the MTR can be secured. In this case, the body power line PBD corresponds to the third electric path (path for electrically connecting the body power source BBD to the electric motor MTR).

The BWH decreases in performance (for example, voltage drop), and braking is requested. However, power supply from the BWM may not be able to be performed. In this case, the closed position of the SWb and the open position of the SWc are selected. The decrease in performance of the BWH can be determined on the basis of the voltage of the BWH. Since the decrease in performance can be caused by a lack of storage amount of the BWH, the decrease in performance can be determined on the basis of the charging state amount Jda.

More specifically, when a voltage EBWH of the BWH is smaller than a predetermined value eb0, or when the charging state amount Jda is smaller than a predetermined value jd0, the decrease in performance can be determined. When the decrease in performance of the BWH is determined, a power supply path from the BBD to the MTR is given by "BBD (or ALT)→Db→PBD→SWb→HBR→MTR". When a function is lost in the BWH, power supply to the MTR is performed from the BBD. The open position of the SWc and the diode Dc cut the electric connection between the BWH and the HBR due to a potential difference. Although a current conducted from the BBD may flow into the BWH, the open position (non-conducting) of the SWc is selected, and a current conduction direction is limited by the diode Dc. For this reason, current conduction to the BWH side can be prevented. As a result, even though a decrease in performance occurs in the BWH, minimum current conduction to the MTR can be secured by power supply from the BBD.

Second Embodiment of Power Source Management Means Dgk

In the first embodiment of the power source management means DGK described above, the switch SWb is disposed to cut power supply from the BBD and/or the ALT to the MTR, however, the SWb can be omitted. More specifically, the voltage conversion means (converter) DCC adjusts the value of the vehicle wheel power source BWH to an adequate value to make it possible to cut the power supply from the BBD or the like to the MTR without using the SWb.

A resistance (in particular, resistance of the vehicle power line PBD) of a wire from the body power source BBD to the electric motor MTR is represented by RPBD, a resistance of a wire (vehicle wheel power line, bus bar) from the converter DCC to the MTR is represented by RWHL, an internal resistance of the electric motor MTR is represented by RMTR, a voltage of the BBD is represented by EBBD, and an output voltage of the DCC is represented by EDCC. In this case, a current iBBD supplied from the BBD to the MTR, a current iBWH supplied from the BWH to the MTR, and a current iMTR finally conducted to the electric motor MTR are expressed by the following equations:

$$iBBD=\{(RWHL+RMTR)\cdot EBDD-RMTR\cdot EDCC\}/(RPBD\cdot RWHL+RWHL\cdot RMTR+RMTR\cdot RPBD) \quad \text{Equation (1)}$$

$$iBWH=\{-RMTR\cdot EBDD+(RPBD+RMTR)\cdot EDCC\}/(RPBD\cdot RWHL+RWHL\cdot RMTR+RMTR\cdot RPBD) \quad \text{Equation (2)}$$

$$iMTR=iBBD+iBWH=(RWHL\cdot EBBD+RPBD\cdot EDCC)/(RPBD\cdot RWHL+RWHL\cdot RMTR+RMTR\cdot RPBD) \quad \text{Equation (3)}$$

In Equation (3), when the resistance RWHL is considerably smaller than the resistance RPBD and approximately "0" (RWHL«RPBD), power supply from the body power source BBD to the bridge circuit HBR (i.e., the electric motor MTR) is cut (blocked), and electric power from the converter DCC (i.e., the vehicle wheel power source BWH) is supplied to the bridge circuit HBR. For example, it is assumed that the RPBD (resistance of the conductive wire PBD, contact resistances of the connectors CNB and CNC, and the like) is set to 200 mΩ, the RWHL is set to 10 mΩ (resistance of the bus bar PWH), the RMTR is set to 250 mΩ (coil resistance of the electric motor, and contact resistance of the brush BLC, resistances of the S1 to S4, and the like), and a state in which pressing force is held without rotating the MTR (i.e., counterelectromotive force is not generated) is assumed. The body power source BBD having a power source voltage EBBD=12 V is connected to the MTR and the vehicle wheel power source BWH is not connected to the MTR, the BBD supplies a current of 26.7 A to the MTR. Under this condition, when the vehicle wheel power source BWH the voltage of which is adjusted to the EDCC=12 V is connected, the current iBBD supplied from the BBD to the MTR becomes 2.2 A, the current iBWH supplied from the BWH to the MTR becomes 44.0 A, and the current iMTR finally conducted to the electric motor MTR becomes 46.2 A. Thus, power supply from the BBD is suppressed to 4.8%, and 95.2% of the current from the BWH are supplied to the MTR.

Furthermore, when an output voltage of the converter DCC is increased, a current tends to flow from the DCC to the BBD due to a potential difference between the DCC and the BBD. However, the diode Db prevents a current from flowing from the DCC side to the BBD side. Thus, current conduction from the BBD to the MTR can be completely cut. An output voltage (cutoff voltage) E0 of the DCC obtained when the current conduction from the BBD may be completely cut can be calculated on the basis of the resistances (RMTR and the like) and the voltage value EBBD of the BBD. More specifically, the cutoff voltage E0 is calculated as the value of the EDCC when iBBD=0 is satisfied such that the resistances (known) and the voltage value (known) of the BBD are assigned to the equations described above. The voltage conversion means DCC increases the voltage EBWH of the vehicle wheel power source BWH to a voltage higher than the cutoff voltage E0, the current conduction from the body power source BBD to the electric motor MTR is completely cut, and power supply to the MTR can be performed by the BWH alone.

Even in the second embodiment, similarly, when the BWH is charged, the SWc is set to the closed position. When a braking request is made during charging, the SWc is changed from the closed position to the open position. At this time, the DCC adjusts the voltage of the BWH to the voltage of the BBD or more. When the storage amount of the BWH is sufficient to make it possible to supply electric power, power supply can be performed from the BWH side through the Dc due to a potential difference. On the other hand, when the storage amount of the BWH is insufficient to make it impossible to supply electric power, the BWH and the HBR are disconnected from each other by the Dc and the closed position of the SWc. For this reason, current conduction from the BBD to the BWH is prevented.

Similarly, when the BWH decreases in performance (for example, voltage drop), power supply from the BBD side to the HBR side is performed by a potential difference. More specifically, since the output voltage of the DCC decreases, a current from the BBD tends to flow to the DCC side. However, this flow is cut by the diode Dc and the open position of the SWc. As a result, since all electric power from the BBD side is supplied to the HBR, minimum current conduction to the MTR can be secured.

Also in the second embodiment, similarly, when braking is requested (at the request of braking), electric power is supplied from the vehicle wheel power source BWH to the electric motor MTR. In order to more effectively supply power, the output voltage EDCC of the converter (voltage conversion means) DCC can be adjusted to a voltage higher than the voltage EBBD of the body power source BBD. In other words, the voltage EBWH of the vehicle wheel power source BWH is increased to the value (EDCC) larger than the voltage EBBD of the body power source BBD. The BWH is gradually charged for a long time by the body power source BBD when braking is not requested (at the request of non-braking). Thus, no large current corresponding to sudden braking is not caused to flow in the body power line (first electric path, for example, twisted pair cable) PBD. At the request of braking, since a large current is supplied from the vehicle wheel power source BWH to the electric motor MTR through the vehicle wheel power line (second electric path, for example, bus bar) PWH, a thin (having a small sectional area) conductive wire can be employed as the body power line PBD.

Third Embodiment of Power Source Management Means Dgk

A third embodiment of a power source management means DGK will be described below. In the embodiment, at the request of normal braking (when Imt<imx (will be described later) is satisfied), electric power to drive the electric motor MTR is supplied from the body power source (first power source) BBD to the DRV (i.e., to the MTR through the switching elements). This power supply is performed through the ECU and the body power line PBD. At the request of sudden braking (when Imt≥imx (will be described later) is satisfied), power supply to the electric motor MTR is performed by the body power source BBD and the vehicle wheel power source (second power source) BWH. The vehicle wheel power source BWH supplies electric power to the MTR through the vehicle wheel power line (power line) PWH.

In this embodiment, when a lack of power supply from the body power source BBD to the drive means DRV may occur (Imt≥imx), the vehicle wheel power source BWH assists the power supply to the DRV. Since the BWH is a auxiliary power source, as the BWH, a power source having an energy capacity (storage capacity) smaller than that of the BBD is employed. Power supply patterns to the electric motor MTR when the BBD is normal are power supply patterns of two types which include a power supply pattern achieved by the BBD alone and a power supply pattern by the BBD and the BWH. More specifically, the MTR is not driven by power supply from only the BWH (there is no power supply pattern achieved by the BWH alone). At the request of non-braking, the BWH is charged by the BBD (or the alternator ALT of the vehicle). The request of non-braking means that braking torque is not requested to be given to the vehicle wheel, for example, that a driver does not operate the braking operation member BP (i.e., when Bpa=0 is satisfied).

In this embodiment, the determination calculation block HNT switches the switching means SWX on the basis of the target current conduction amount Imt to adjust a power source (i.e., a power source of the MTR) to the bridge circuit HBR. More specifically, when the HNT calculates the target current conduction amount Imt as a value smaller than the first threshold value (predetermined value set in advance) imx (Imt<imx), an electric circuit connection is configured such that "the HBR is connected to the BBD and disconnected from BWH". When the Imt is the imx or more (Imt≥imx), the SWX is switched such that "the HBR is connected to both of the BBD and BWH". In other words, under the normal braking state (Imt<imx), the electric motor MTR receives electric power supplied from the body power source BBD only (power supply performed by the BBD alone). However, when a lack of power supply to the MTR is predicted by sudden braking (Imt≥imx), power supply is performed by the body power source BBD and the vehicle wheel power source BWH (composite power supply performed by the BBD and the BWH).

The sign of the target current conduction amount Imt designates the normal/reverse rotation of the electric motor MTR. However, when the sign of the Imt is considered, a magnitude relation is complex. For this reason, in the explanation, the magnitude relation is expressed by the absolute value (magnitude of the value) of the Imt. Thus, a determination condition given by "Imt<imx (imy)" is equivalent to "Imt falls within the range of ±imx (imy)". Similarly, a determination condition given by "Imt≥imx (imy)" is equivalent to "Imt falls out of the range of ±imx (imy)".

The power source management means DGK according to the embodiment will be described below with reference to FIG. 5. The power source management means DGK controls connection states between the power sources (BBD, ALT, and BWH) and the bridge circuit HBR. The power supply management means DGK includes the switching means SWX (collective term of the switches SWc and SWe), the determination calculation block HNT, and the charging state amount acquiring means JDA. The switching means SWX (SWe and SWc) are ON/OFF switches. The switching means (switch) SWe is used for power assistance for the bridge circuit HBR, and the switching means SWc is used to charge the vehicle wheel power source BWH. The switching means SWX, on the basis of a calculation result (signals Csc and Cse) obtained in the determination calculation block HNT, are switched between a closed state (conducting state) and an open state (non-conducting state). The switch SWc is set to the closed state (connection state) when the vehicle wheel power source BWH is charged, and is set to the open state (non-connection state) in the other cases.

At the request of normal braking (when sudden braking (will be described later) is not requested), electric power is supplied from only a body-side power source (at least one of the body power source BBD and the alternator ALT) to the bridge circuit HBR (circuit for supplying electric power to the electric motor MTR). The determination calculation block HNT, on the basis of the target current conduction amount Imt transmitted from the target current conduction amount calculation block IMT, outputs the drive signal Cse of the switch SWe and the drive signal Csc of the switch SWc to control the connection states of the switches SWe and SWc. More specifically, when the target current conduction amount Imt is smaller than the current conduction threshold value imx, the switch SWe is set to the open position (non-conducting state) to cut the connection between the vehicle wheel power source BWH and the bridge circuit HBR. In this case, the power supply to the HBR is performed by the power sources (BBD and ALT) disposed on the vehicle body through the body power line PBD. At the request of normal braking as in Imt<imx (for example, when a deceleration of the vehicle is smaller than 0.3 G), since the current conduction amount to the MTR is not too large, the power supply is performed by only the body-side power sources BBD and ALT without using the vehicle-wheel-side power sources BWH.

On the other hand, at the request of sudden braking, electric power is supplied to the bridge circuit HBR by using not only the body-side power source but also the vehicle-wheel-side power source. More specifically, when the target current conduction amount Imt is the current conduction threshold value (predetermined value) imx or more, the switch SWe is set to the closed position (conducting state) to connect the vehicle wheel power source BWH and the bridge circuit HBR to each other. More specifically, the converter DCC adjusts a voltage to supply electric power from the BWH to the HBR through the diode Dc and the switch SWe. At this time, the switch SWc is set to the open state (non-conducting state) to prevent a current from the BBD or the like from flowing into the vehicle wheel power source BWH. If the power supply to the bridge circuit HBR is performed by only the body power line PBD, at the request of sudden braking (for example, when a deceleration of the vehicle is 0.3 G or more, or when a variation with time of the deceleration is large), a large current must be caused to flow in the body power line PBD. Since the PBD has a slight resistance, the large current cannot be caused to flow in the PBD without an influence of voltage drop, and heat generation may also cause an increase in resistance. For this reason, at the request of sudden braking, power supply from the body power source BBD through the body power line PBD is assisted (compensated for) by power supply from the vehicle wheel power source BWH through the vehicle wheel power line PWH. As a result, the sectional area of the body power line PBD need not be increased, and the flexibility of the PBD can be secured.

The vehicle wheel power source BWH supplies electric power to the electric motor MTR when the power supply state of the body power source BBD is inadequate. The power source management means DGK monitors a voltage supplied to the bridge circuit HBR, and determines a disordered state of the body power source BBD when the voltage is smaller than a predetermined voltage. The determination calculation block HNT switches the switch SWe from the open state to the closed state to start power supply from the vehicle wheel power source BWH to the bridge circuit HBR. The diode Db cuts a current supplied from the vehicle wheel power source BWH to the body power source BBD. The vehicle wheel power source BWH accessorily supplies electric power in an emergent situation in which the power supply performance of the body power source BBD is deteriorated.

<Time-Series Operations of the Present Invention>

Time-series operations in the third embodiment and advantages thereof will be described below with reference to FIGS. 6A and 6B while two situations (inertia compensation control and antiskid control) are supposed.

FIG. 6A is a time-series diagram obtained when a driver performs sudden braking. At a point of time t0, the driver starts a braking operation, a command current conduction amount Ist arithmetically operated on the basis of the braking operation amount Bpa begins to increase. Depending on the Ist, current conduction to the electric motor MTR is performed from the body power source BBD. At this time, the switch SWe is in the open state (non-conducting position), and the vehicle wheel power source BWH is not connected to the bridge circuit HBR. More specifically, power supply to the electric motor MTR is performed by only the body power source BBD.

At the point of time t1, it is determined that the inertia compensation control is required, the inertia compensation current conduction amount Ikt (indicated by a hatched portion) is added to the command current conduction amount Ist to sharply increase the target current conduction amount Imt. In this case, the inert compensation current conduction amount Ikt is a target value of a current conduction amount to compensate for the inertia (moment of inertia) of the braking means BRK (in particular, the MTR). At a point of time t2, the condition in which the Imt is the current conduction threshold value (first threshold value) imx or more (Imt falls out of the range of ±imx) is satisfied, and the switch SWe is changed from the open state (non-conducting position) to the closed state (conducting position). In this case, the first threshold value imx is a threshold value to switch the SWe from the open position to the closed position. When the SWe is switched from the open position to the closed position, the bridge circuit HBR receives energy supplied from the two power sources (BBD and BWH). Since power supply from the BBD is assisted by power supply from the BWH, even though a thin wire (having high flexibility and limited current conduction performance) is employed as the body power line (power line) PBD, a sufficient current conduction amount can be secured depending on the target current conduction amount Imt. As the power line (vehicle wheel power line) PWH from the vehicle wheel power source BWH to the bridge circuit HBR, a bus bar can be employed. Since the bus bar has a low electric resistance, a larger current can flow in the bas bar.

At a point of time t3, a condition in which the target current conduction amount Imt is smaller than the current conduction threshold value (second threshold value) imy (Imt falls within the range of ±imy) is satisfied. However, the SWe cannot be immediately switched from the closed position to the open position. In this case, the second threshold value imy is a predetermined value smaller than the first threshold value imx, and is a threshold value to switch the SWe from the closed state to the open state. Switching of the SWe from the closed position to the open position is performed at a point of time t5 at which a predetermined time tx has elapsed from the point of time t3 at which the condition given by Imt<imy is satisfied. At the point of time t3, the power supply assistance is not immediately ended, and is ended at the point of time t5 at which the predetermined time tx continues after the point of time t3. This is because, in sudden braking in which inertia compensation control is executed, after the inertia compensation control is ended, the probability that the Imt exceeds the imx again is high. After the SWe is switched from the open position to the closed position, at a point of time at which the predetermined time tx has elapsed from a point of time at which Imt is smaller than the imy, the SWe is retracted from the closed position to the open position. For this reason, cumbersome switching of power sources can be suppressed. Furthermore, since the second threshold value imy is set to a value smaller than the first threshold value imx in advance, when the target current conduction amount Imt finely changes near the value imx, hunting determination (phenomenon in which ON/OFF state are repeated) can be suppressed.

FIG. 6B is a time-series diagram obtained when antiskid control for suppressing wheel slip is executed. When sudden braking performed by a driver sharply accelerates the electric motor MTR under the inertial compensation control, a situation in which the antiskid control is started can be supposed. In this case, in order to decrease the braking torque, the MTR accelerated in the normal direction is requested to be sharply decelerated and driven in the reverse direction.

At the point of time t0, the driver starts the operation of the braking operation member BP to increase the target current conduction amount Imt from zero (non-braking state). At the point of time t1, the inertia compensation control is started. Since the target current conduction amount Imt is not equal to or larger than the threshold value imx, the switch SWe is kept at the open position (non-conducting state). At a point of time t6, since the antiskid control is started to reversely rotate the electric motor MTR which has been rotated in the normal direction, the Imt is increased in the negative direction. At this time, the condition in which the Imt is the imx or more (in consideration of the sign, the Imt falls out of the range of ±imx) is satisfied, and the SWe is switched from the open position to the closed position. In addition to the power supply from the body power source BBD, the power supply from the vehicle wheel power source BWH is applied, wheel slip caused by late reversing (overshoot of the braking torque) of the electric motor MTR can be suppressed from increasing. The switching of the SWe to the open position, as described above, is performed after the predetermined time tx has been elapsed from when the Imt falls within the range of ±imy. In the antiskid control, the SWe is kept at the closed position and switched to the open position after the control is finished.

In the antiskid control using the electric motor MTR, since the MTR which is being rotated in the normal direction must be temporarily stopped, and then driven in the reverse direction, a large current is required. Also in this case, the switching means SWe is switched from the open position to the closed position to supply electric power from the two power sources including the body power source BBD and the vehicle wheel power source BWH to the bridge circuit HBR. Furthermore, electric power can be supplied from the vehicle wheel power source BWH to the bridge circuit HBR through the bus bar PWH having a small electric resistance. For this reason, even though the thin body power line PBD is employed, a sufficient current can be supplied to the electric motor MTR.

In the third embodiment, the switch SWe is switched on the basis of the target current conduction amount Imt. However, since the Imt is arithmetically operated on the basis of the braking operation amount Bpa, another state amount can be employed as the Imt. More specifically, in the arithmetic operation process, the switch SWe can be switched on the basis of at least one of the state amounts (for example, Fbt and Imt) from the braking operation amount Bpa to the target duty ratio Dut.

Fourth Embodiment of Power Source Management Means Dgk

A fourth embodiment of the power source management means DGK will be described below with reference to FIG. 7. In this embodiment, the vehicle wheel power source BWH is called an emergency power source BEM. In this embodiment, in a normal state (when an adequate state (will be described below) is determined), electric power to drive the electric motor MTR is supplied from the body power source (first power source) BBD to the DRV (i.e., to the MTR through the switching elements). This power supply is executed through the ECU and the body power line PBD. In case of emergency (an inadequate state (will be described later) is determined), the electric motor MTR is driven in a reverse direction (direction in which braking torque decreases) by an emergency power source (second power source, i.e., the vehicle wheel power source) BEM.

The emergency power source BEM is charged by current conduction from the body power source (main power source) BBD in a normal traveling state (when no braking torque is not requested to be given to a vehicle wheel). This charging (power supply from the BBD to the BEM) is performed through the ECU and the body power line (first power line) PBD. The body power source BBD supplies electric power to the electronic control unit ECU disposed on the body side and the braking means BRK (in particular, the drive circuit DRV) disposed on the vehicle wheel side.

The emergency power source BEM supplies electric power to the DRV when the state of power supply from the body power source BBD to the drive means DRV becomes inadequate (i.e., when an inadequate state is determined). However, since the BEM is disposed on the vehicle wheel, the BEM is limited in size and resistance to vibration. Thus, as the BEM, a power source having an energy capacity (storage capacity) which is considerably smaller than that of the BBD is employed. For this reason, the BEM is not used to normally rotate the electric motor MTR (i.e., to increase or hold braking torque) when the BBD is disordered, and the BEM is used only to reversely rotate the MTR (to decrease the braking torque and to suppress the friction member from dragging). The BEM is charged by the BBD (or the alternator ALT of the vehicle) at the request of non-braking. The request of non-braking means that braking torque is not requested to be given to the vehicle wheel, for example, that a driver does not operate the braking operation member BP (i.e., when Bpa=0).

The electric capacity (electric energy capacity) of the emergency power source BEM is set on the basis of losses (for example, torque losses caused by friction) in the electric motor MTR and the power transmission members GSK and NJB. More specifically, the electric capacity of the emergency power source BEM may be an electric capacity which is necessary and sufficient to be able to compensate for the loss of the power transmission member and to change the pressing force Fba of the pressing member PSN from the maximum design value to a first predetermined value fb1 or less. More specifically, the electric capacity of the emergency power source BEM corresponds to one retracting operation (operation in which braking torque is decreased by reversely driving the electric motor MTR). However, the electric capacity of the emergency power source BEM may be a capacity which does not correspond to two or more retracting operations. The emergency power source BEM is to cope with a case in which an inadequate state occurs in the power source system (power source itself or connection states of the power lines, the connectors, and the like). For this reason, the capacity is regulated to the minimum capacity to make it possible to make the BEM compact and to easily dispose the BEM inside the caliper CPR. As also the emergency power source BEM, the electric double-layer capacitor (to also be referred to as an ultra capacitor or a super capacitor) described above can be employed.

The current conduction amount adjustment calculation block IMT arithmetically operates the target current conduction amount Imt serving as a final target value for the electric motor MTR. In the IMT, the command current conduction amount Ist is adjusted by the pressing force feedback current conduction amount Ift to arithmetically operate the target current conduction amount Imt. More specifically, the feedback current conduction amount Ift is added to the command current conduction amount Ist, and the resultant value is arithmetically operated as the target current conduction amount Imt. A rotating direction (normal direction in which the pressing force increases or reverse direction in which the pressing force decreases) of the electric motor MTR is determined on the basis of the sign (positive/negative value) of the target current conduction amount Imt, and an output (rotating power) of the electric motor MTR is controlled on the basis of the magnitude of the target current conduction amount Imt.

The current conduction adjustment calculation block IMT receives a control flag FLdg representing a power supply state from the power source management means DGK. In this case, the control flag FLdg represents a result obtained by executing a condition determination process (process of determining whether the body power source BBD is in an adequate state or in an inadequate state) in the DGK. More specifically, when "FLdg=0" is output when the adequate state is determined, and "FLdg=1" is output when the inadequate state is determined. In the IMT, when the "FLdg=0 (adequate state)" is received, the above target current conduction amount Imt in the normal state is arithmetically operated. On the other hand, when the "FLdg=1 (inadequate state)" is received, in place of the Imt, immediately, a signal for reversely rotating the electric motor MTR in a direction (i.e., direction in which braking torque decreases) in which the friction member MSB comes away from the rotating member KTB is output from the IMT.

The drive circuit DRV includes the power source management means DGK. The power source management means DGK monitors a power supply state from the body power source BBD to the DRV to determine whether the BBD is in an adequate state. When it is determined that "the BBD is in the adequate state", the DGK designates the BBD to supply electric power to the DRV. On the other hand, when it is determined that "the BBD is not in the adequate state (in the inadequate state)", the power source management means DGK stops power supply from the body power source BBD to designate the emergency power source BEM to supply electric power to the drive circuit DRV. An inadequate state of the power supply to the drive circuit DRV may be caused by a decrease in performance of the body power source BBD, disconnection of the power line PBD, contact failure of the connectors CNB and CNC, and the like. In this case, whether the BBD is adequate can be determined on the basis of the voltage Vla of the body power source BBD. More specifically, when the voltage of the body power source BBD decreases, the power source management means DGK changes the power source to the drive circuit DRV from the body power source BBD to the emergency power source BEM.

Furthermore, when "the adequate state of the BBD" is determined, the power supply management means DGK transmits the control flag FLdg=0 to the current conduction adjustment calculation block IMT as the determination result. When "the inadequate state of the BBD" is determined, the power source management means DGK transmits the control flag FLdg=1 to the IMT. The control flag FLdg is used to determine whether, in the IMT (part of the control means CTL), control based on the target current conduction amount Imt in the normal state (FLag=0) is performed or reverse rotation control of the electric motor MTR in case of emergency (when FLdg=1) is performed. In the reverse rotation control of the MTR, the pressing member PSN is retracted to reversely rotate the MTR to separate the friction member (brake pads) MSB from the rotating member (brake disk) KTB (in the HBR, the S1 and the S4 are in non-conducting states and the S2 and the S3 are in conducting states).

The power source management means DGK monitors a storage state of the emergency power source BEM and charges the emergency power source BEM as needed. More specifically, when a driver does not perform a braking operation (at the request of non-braking), the body power source BBD (or the alternator) supplies electric power to charge the emergency power source BEM. In this case, the "request of non-braking" is determined on the basis of the braking operation amount Bpa. More specifically, the non-braking state is determined by the condition in which the Bpa is smaller than the predetermined value bpx. Alternatively, the stop switch STP is disposed on the braking operation member (braking pedal) BP, and the non-braking state can be determined on the signal Stp.

As shown in FIG. 8, the drive means DRV includes the emergency power source BEM and the power source management means DGK for managing the emergency power source BEM. These components are disposed in the CPR (fixed on the vehicle wheel side). The emergency power source (second power source) BEM supplies electric power to the electric motor MTR when the power supply state of the body power source (first power source) BBD is inadequate. More specifically, the BEM is to accessorily supply electric power in an emergent situation in which the electric power supply performance of the BBD is deteriorated. For example, the BEM includes an electric double-layer capacitor (to also be simply referred to as a capacitor) CAP and a DC-DC converter (to also be simply referred to as a converter) DCC. Since the capacitor CAP has an internal resistance lower than that of a secondary battery (accumulator), the capacitor CAP can be charged/discharged within a short period of time. The DC-DC converter DCC converts an output voltage from the capacitor CAP into a voltage matched with the electric motor MTR. As the vehicle wheel power line PWH serving as a power supply path from the BEM to the MTR, a bus bar can be employed. The employment of the bus bar makes complex terminal processing unnecessary and enables the power line to be easily disposed and to be suitable for supply of a large current.

The power source management means DGK (part of control means CTL) determines whether the body power source BBD can adequately supply electric power (adequate state) or not (inadequate state). When the adequate state is determined, the power source management means DGK supplies electric power from the body power source (first power source) BBD to the bridge circuit HBR (S1 to S4, finally the MTR). On the other hand, when the inadequate state is determined, the power source management means DGK supplies electric power from the emergency power source (second power source) BEM to the bridge circuit HBR through the diode Dc. More specifically, the power source management means DGK includes a voltage acquiring means VLA and a switching means (switch) KRK. The voltage acquiring means VLA acquires (detects) the supply voltage Vla of the body power source BBD. The DGK determines the "adequate state" when the supply voltage Vla is a predetermined voltage (predetermined threshold value) vlx or more, and determines the "inadequate state" when the Vla is smaller than vlx. On the basis of the determination result, the switching means KRK connects the body power source BBD to the bridge circuit HBR when the "adequate state" is determined, and connects the emergency power source BEM to the bridge circuit HBR when the "inadequate state" is determined.

Furthermore, the power source management means DGK transmits the control flag (determination result) FLdg representing the power supply state of the body power source BBD to the target current conduction amount calculation block IMT. More specifically, the power source management means DGK outputs FLdg=0 when the "adequate state" is determined, and outputs FLdg=1 to the target current conduction amount calculation block IMT when the "inadequate state" is determined. In other words, as the control flag (suitability/unsuitability flag representing whether the BBD is suitable or unsuitable), "0 (normal)" is continuously output when the BBD suitably functions, and "0 (normal)" is switched to "1 (abnormal)" when the power supply function of the body power source BBD is deteriorated. The target current conduction amount calculation block IMT execute control (control in a normal state) of the electric motor MTR based on the braking operation amount Bpa in response to the suitability/unsuitability flag FLdg when FLdg=0 is satisfied. However, when FLdg=1 is received, immediately, the power supply from the emergency power source BEM switches the control to control (control in case of emergency) for reversely rotating the electric motor MTR.

The power supply management means DGK includes a charging means JDN to charge the emergency power source BEM. In the BEM, electricity is lost with the elapse of time by self-discharging. Thus, when a driver does not operate the braking operation member BP (for example, determined by Bpa<bpx), the charging means JDN causes a current to flow from the BBD (or the ALT) to the BEM and accumulates (charges) electric charges in the BEM. The JDN finishes the charging when electric charges are sufficiently accumulated in the BEM (full charging). The end of charging (full charging) is determined on the basis of the charging state amount Jda of the BEM.

For example, the voltage of the emergency power source BEM is detected as the charging state amount Jda, and a full charging state can be detected on the basis of a change in voltage of the BEM. Furthermore, on the basis of the capacity of the BEM and a charging/discharging time, full charging can be determined by an arithmetic operation process programmed in the charging means JDN. Furthermore, the JDN can employ, as a charging method, at least one of $-\Delta V$ charging, temperature-control charging, dT/dt control charging, pulse charging, and trickle charging. In the $-\Delta V$ charging, when charging is further performed in a full-charging state, by using a phenomenon in which the voltage of a battery slightly decreases, the charging is performed on the basis of the change in voltage. In the temperature control charging, the temperature of the battery BEM is detected as the charging state amount Jda, and charging is performed on the basis of an increase in temperature of the battery. In the dT/dt control charging, a derivative value (variation with time dJda of the Jda) of the temperature (increase) of the battery BEM is detected, and charging is performed on the basis of dJda. In the pulse charging method, after a predetermined voltage is achieved by constant-current charging, the charging is continued by a pulse current. In the pulse charging, it is permitted that a cell voltage exceeds a predetermined voltage for only an extremely short time, and the cell voltage is finely monitored to suppress overcharging, and boost charging can be achieved. In the trickle (Trickle) charging method, a weak current which is too small to be loaded on the battery characteristic and to influence the battery characteristic is always supplied, thereby maintaining a full-charging state.

When the inadequate state of the body power source BBD is determined (FLdg=1), control (control based on the Bpa) in a normal state is not continued by power supply from the emergency power source BEM, control in the normal state is immediately ended, and the control is switched to control (retracting control) in case of emergency. In order that the emergency power source BEM is mounted in the caliper CPR, the storage capacity of the emergency power source BEM is limited, and the power supply performance of the emergency power source BEM is limited. When the power sources are switched, control methods for the electric motor MTR are also changed. For this reason, even though the emergency power source BEM having a limited capacity is used, a problem caused by dragging the friction member MSB can be reliably solved (dragging torque generated by thermal expansion of the friction member MSB is suppressed from increasing, and the securement of directional stability of the vehicle can be achieved).

The emergency power source (second power source) BEM is disposed in an electric path between the vehicle-wheel side connector (i.e., the connector fixed to the caliper CPR) CNC and the electric motor MTR. More specifically, the BEM is connected to the electric path between the CNC and the MTR. In the connector CNC, since current conduction in the wire is performed by contact of contact pins (male and female pins are fitted to each other), the contact may be loosened by vibration. Since the emergency power source BEM is disposed in an electric circuit from the vehicle wheel side connector (BRK-side connector) CNC to the bride circuit HBR (i.e., the electric motor MTR), even though contact failure of the connector CNC occurs, electric motor control in case of emergency can be properly executed.

The voltage acquiring means VLA, in the electric circuit of the drive means DRV, is disposed (connected) between the vehicle-wheel-side connector CNC and the switching means KRK (switching means for switching between the electric path from the body power source BBD to the electric motor MTR and the electric path from the emergency power source BEM to the electric motor MTR). More specifically, the VLA acquires (detects) the voltage of the electric path between the CNC and the KRK. As described above, since the voltage acquiring means VLA is disposed between the connector CNC and the bridge circuit HBR (i.e., the electric motor MTR), the voltage acquiring means VLA can cope with an inadequate state caused by disorder (for example, contact failure) of the connector CNC.

In switching from the adequate state to the inadequate state, a voltage sensor is disposed, and, on the basis of a detection value of the voltage sensor, it is determined whether the body power source BBD is suitable (whether the body power source BBD is in an adequate state or in an inadequate state). However, the switching determination is not limited to an electronic means, and an electric/mechanical switching means configured by a relay or the like can be employed.

<Time-Series Operation of the Present Invention>

A time-series operation in a fourth embodiment and an advantage thereof will be described below with reference to FIGS. 9(a) and 9(b) while assuming the following situations. In traveling of a vehicle, at a point of time t0, a braking operation by a driver increases the braking operation amount Bpa to a certain value bp1. At the point of time t0, the power supply performance of the body power source BBD is normal, and power supply is performed from the BBD to the bridge circuit HBR (i.e., the electric motor MTR). At the beginning of braking, although the state of the BBD is adequate, the voltage begins to gradually decrease.

As shown in FIG. 9A, the supply voltage Vla of the body power source BBD gradually decreases, and is lower than the voltage threshold value (predetermined voltage) vlx at a point of time t3. At this time, the control means CTL (in particular, the power source management means DGK) switches the power source to the electric motor MTR from the body power source BBD to the emergency power source BEM (voltage Vlb). In this manner, the voltage supplied to the bridge circuit HBR is increased from the value vlx to the value vll (appropriate voltage value supplied by the emergency power source BEM). Furthermore, up to the point of time t3, the target current conduction amount Imt is arithmetically operated on the basis of the braking operation amount Bpa (control in a normal state is executed). However, since retracting control in case of emergency (control in which the pressing member PSN is driven in a direction in which the pressing member PSN comes away from the rotating member KTB to decrease friction between the friction member MSB and the rotating member KTB) is executed, the target current conduction amount Imt is decreased to a predetermined value im2 (negative value, which is a current conduction amount at which the electric motor MTR is reversely rotated). The retracting control decreases the actual pressing force Fba from the value fb1 to almost zero (state in which dragging does not occur) (point of time t4). The target current conduction amount Imt of the electric motor, as shown in (1), after a point of time t3 at which an inadequate state is determined, is kept at a value im2. Alternatively, as shown in (2), after the pressing force Fba becomes almost zero (for example, after a predetermined time tx has elapsed), at a point of time t5, Imt=0 is satisfied, and current conduction from the emergency power source BEM to the electric motor MTR can be stopped.

When it is determined that the body power source BBD is disordered, the power source to the electric motor MTR is changed from the body power source BBD to the emergency power source BEM. At this time, the emergency power source BEM does not continue the normal control (control based on the Bpa) of the electric motor MTR, but immediately reversely rotates the electric motor MTR to separate the friction members MSB from the rotating member KTB as control in case of emergency. Since electric energy (power consumption) required for the control in case of emergency is limited, the emergency power source BEM can be reduced in size and weight and can be mounted in the caliper CPR. In a retracting mechanism which employs a mechanical spring, in normal control, energy must be accumulated in the spring every braking operation. Since the compact emergency power source BEM performs a retracting operation (i.e., reversely rotating operation of the electric motor MTR) in case of emergency, a needless energy consumption can be suppressed. In the retracting control in case of emergency, reverse rotation of the MTR can achieve a state in which dragging (resistance caused by slight contact between the MSB and the KTB) is almost zero. For this reason, the directional stability of the vehicle can be secured. More specifically, when the electric braking device is disposed on front wheels, in case of a failure of the body power source BBD, the front wheels can be suppressed from skidding to make it possible to suppress the understeer behavior of the vehicle. When the electric braking device is disposed on rear wheels, in case of a failure of the body power source BBD, the rear wheels can be suppressed from skidding to make it possible to suppress the oversteering behavior of the vehicle.

In FIG. 9B, although the same voltage drop as that in FIG. 9A occurs, another example in which the pattern of the target current conduction amount Imt obtained after the body power source BBD is determined to be in an inadequate state is different from that in FIG. 9A is shown. In this example, at a point of time (t3) at which the BBD is determined to be disordered, current conduction to the electric motor MTR is temporarily stopped. Due to the rigidities (spring constant and elasticity) of the friction members MSB and the caliper CPR, the actual pressing force Fba is gradually decreased. At a point of time (t6) at which the Fba is smaller than the predetermined value fb2, power supply from the emergency power source BEM starts current conduction to drive the electric motor MTR in the reverse rotating direction. The threshold value fb2 is set to a value which is slightly larger than a pressing force fb0 corresponding to loss torques of the power transmission mechanisms NJB and GSK and a holding torque of the MTR. In this case, since the value fb0 is a value determined in design of the device, the value fb2 is a predetermined value which is set in advance. Since the electric capacity of the BEM need only be a minimum capacity required to retract the pressing force from the value fb2 to zero, the BEM can be further reduced in size and weight. As in the example indicated by (1) in FIG. 9A, at a point of time (t8) at which the predetermined time tx has elapsed from a point of time (t7) at which the Fba becomes almost zero, current conduction to the MTR can be stopped (see broken line (4)).

REFERENCE SIGNS LIST

MSB . . . friction member, KTB . . . rotating member, MTR . . . electric motor, BBD . . . body power source, BWH . . . vehicle wheel power source, CTL . . . control means, JDA . . . charging state amount acquiring means, SWb . . . switching means, Jda . . . charging state amount, PBD+PWH . . . first electric path, PWH . . . second electric path, PBD . . . third electric path, Imt . . . current conduction target value, Ikt . . . inertia compensation current conduction amount, BEM . . . emergency power source, Fba . . . pressing force

The invention claimed is:

1. An electric braking device for vehicle comprising:

a rotating member fixed to a wheel of a vehicle;

an electric motor disposed on a vehicle wheel side of the vehicle;

a friction member which uses drive torque of the electric motor to press the rotating member and to generate braking torque on the vehicle wheel;

a body power source disposed on a body side of the vehicle;

a vehicle wheel power source disposed on the vehicle wheel side of the vehicle, a first electric path being arranged to supply electric power from the body power source to the vehicle wheel power source and a second electric path being arranged to supply electric power from the vehicle wheel power source to the electric motor;

a charging state amount detector which acquires a charging state amount of the vehicle wheel power source; and an electric circuit which uses at least one of the body power source and the vehicle wheel power source on the basis of a braking operation by a driver of the vehicle to drive the electric motor, the electric circuit being configured such that, when braking torque is generated on the vehicle wheel, the electric motor is driven by using the vehicle wheel power source, the electric circuit including a switch which connects/disconnects a third electric path to supply electric power from the body power source to the electric motor and being configured to 1) disconnect the third electric path to drive the electric motor by using only the vehicle wheel power source when the charging state amount is not less than a first predetermined value, and 2) connect the third electric path to drive the electric motor by using the vehicle wheel power source and the body power source when the charging state amount is less than the first predetermined value.

2. The electric braking device for vehicle according to claim 1, wherein the electric circuit is configured to disconnect the first electric path when the charging state amount is less than a second predetermined value which is equal to or less than the first predetermined value.

3. An electric braking device for vehicle comprising:

a rotating member fixed to a wheel of a vehicle;

an electric motor disposed on a vehicle wheel side of the vehicle;

a friction member which uses drive torque of the electric motor to press the rotating member and to generate braking torque on the vehicle wheel;

a body power source disposed on a body side of the vehicle;

a vehicle wheel power source disposed on the vehicle wheel side of the vehicle; and an electric circuit which uses at least one of the body power source and the vehicle wheel power source on the basis of a braking operation by a driver of the vehicle to drive the electric motor, wherein the electric circuit is configured to
calculate a current conduction target value of the electric motor on the basis of the braking operation performed by the driver of the vehicle,
drive the electric motor by using only the body power source when the current conduction target value is less than a first threshold value, and
drive the electric motor by using the body power source and the vehicle wheel power source when the current conduction target value is not less than the first threshold value.

4. The electric braking device for vehicle according to claim 3, wherein
the electric circuit is configured to
calculate an inertia compensation current conduction amount which compensates for an influence of inertia of a power transmission mechanism which operates in relation to generation of braking torque from the electric motor to the friction member to calculate the current conduction target value on the basis of the inertia compensation current conduction amount, and
the electric circuit is configured to
drive the electric motor by using the body power source and the vehicle wheel power source for a time from a point of time at which the current conduction target value reaches the first threshold value while increasing to a point of time at which a predetermined time has elapsed from a point of time at which the current conduction target value reaches a second threshold value which is less than the first threshold value while decreasing after the current conduction target value reaches the first threshold value.

5. An electric braking device for vehicle comprising:
a rotating member fixed to a wheel of a vehicle;
an electric motor disposed on a vehicle wheel side of the vehicle;
a friction member which uses drive torque of the electric motor to press the rotating member and to generate braking torque on the vehicle wheel;
a body power source disposed on a body side of the vehicle;
a vehicle wheel power source disposed on the vehicle wheel side of the vehicle; and
an electric circuit which uses at least one of the body power source and the vehicle wheel power source on the basis of a braking operation by a driver of the vehicle to drive the electric motor, wherein
the electric circuit is configured to
drive the electric motor by using the body power source,
determine whether a power supply state from the body power source to the electric motor is in a normal state or an abnormal state, and
only when the abnormal state is determined and pressing force of the friction member against the rotating member is generated, drive the electric motor by using the vehicle wheel power source in place of the body power source to decrease the pressing force.

6. The electric braking device for vehicle according to claim 5, wherein
the electric circuit is configured to
prevent the electric motor to increase the pressing force from being driven when the electric motor is driven by using the vehicle wheel power source.

\* \* \* \* \*